(12) United States Patent
Katoh

(10) Patent No.: US 8,876,403 B2
(45) Date of Patent: Nov. 4, 2014

(54) OPTICAL CONNECTOR, CONNECTOR ADAPTER, OPTICAL FIBER LINE, AND OPTICAL COMMUNICATION SYSTEM

(75) Inventor: Seiji Katoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 222 days.

(21) Appl. No.: 13/191,065

(22) Filed: Jul. 26, 2011

(65) Prior Publication Data

US 2012/0082416 A1 Apr. 5, 2012

(30) Foreign Application Priority Data

Sep. 30, 2010 (JP) ................................ 2010-222800

(51) Int. Cl.
*G02B 6/38* (2006.01)

(52) U.S. Cl.
CPC ............ *G02B 6/3831* (2013.01); *G02B 6/3895* (2013.01); *G02B 6/3825* (2013.01); *G02B 6/3885* (2013.01)
USPC ................................... 385/72; 385/55; 385/70

(58) Field of Classification Search
CPC ... G02B 6/3825; G02B 6/3831; G02B 6/3895
See application file for complete search history.

(56) References Cited

U.S. PATENT DOCUMENTS

| | | | | |
|---|---|---|---|---|
| 6,688,780 B2 * | 2/2004 | Duran | .............................. | 385/76 |
| 6,764,225 B2 * | 7/2004 | Ngo et al. | ........................ | 385/87 |
| 6,899,468 B2 * | 5/2005 | Ngo et al. | ........................ | 385/87 |
| 7,985,027 B2 * | 7/2011 | Lewallen et al. | ............... | 385/78 |
| 8,137,002 B2 * | 3/2012 | Lu et al. | ........................... | 385/78 |
| 8,419,291 B2 * | 4/2013 | Koreeda et al. | ................. | 385/56 |
| 2002/0061171 A1 * | 5/2002 | Asada | ............................ | 385/60 |
| 2003/0156796 A1 * | 8/2003 | Rathnam et al. | ................ | 385/55 |
| 2003/0165302 A1 * | 9/2003 | Ngo | ................................ | 385/87 |
| 2004/0072454 A1 * | 4/2004 | Nakajima et al. | ............... | 439/79 |
| 2004/0156593 A1 * | 8/2004 | Ngo et al. | ........................ | 385/87 |
| 2005/0058401 A1 * | 3/2005 | Maynard et al. | ................ | 385/56 |
| 2006/0140543 A1 * | 6/2006 | Abendschein et al. | ......... | 385/55 |
| 2006/0280408 A1 * | 12/2006 | Anderson et al. | ............... | 385/54 |
| 2008/0013889 A1 | 1/2008 | Milette | | |

(Continued)

FOREIGN PATENT DOCUMENTS

CN 2514361 Y 10/2002
JP 10206689 A 8/1998

(Continued)

OTHER PUBLICATIONS

F13 Type Multi-Core Optical Fiber Connector C5982: 1997, JIS Handbook 8 Electronics Test Methods/Optoelectronics Part, published by Japanese Standards Association, Apr. 24, 1998; 22 pages total; ISBN4-542-12901-2.
IEC 61754-7; International Standard; Fibre Optic Interconnecting Devices and Passive Components—Fibre Optic Connector Interfaces—Part 7: Type MPO Connector Family; Mar. 2008; ISBN 2-8318-9667-3, Edition 3.0; 31 pages total.
Chinese Office Action dated Oct. 11, 2013, issued in Chinese Patent Application No. 201110213044.9.
Office Action mailed Jun. 3, 2014, 2014 in Japanese Patent Application No. 2010-222800 with English translation.

*Primary Examiner* — Rhonda Peace
(74) *Attorney, Agent, or Firm* — Sughrue Mion, PLLC

(57) ABSTRACT

There are provided an optical connector having one or more protruding portions protruding and one or more recessed portions depressed relative to a reference plane corresponding to a reference face of a coupling of a standard optical connector in a connecting end face of a coupling into which a housing receiving a ferrule is inserted, a connector adapter to which the optical connector can be inserted and coupled, an optical fiber line using the optical connector and the connector adapter to connect optical fibers, and an optical communication system.

12 Claims, 21 Drawing Sheets

(56) References Cited

U.S. PATENT DOCUMENTS

| | | |
|---|---|---|
| 2008/0112672 A1* | 5/2008 | Lewallen et al. ............... 385/58 |
| 2008/0131055 A1 | 6/2008 | Parkman et al. |
| 2008/0145001 A1* | 6/2008 | Beck et al. ...................... 385/78 |
| 2008/0226235 A1* | 9/2008 | Luther et al. .................... 385/62 |
| 2009/0290838 A1* | 11/2009 | Lin et al. ......................... 385/55 |
| 2010/0316333 A1* | 12/2010 | Luther et al. .................... 385/71 |
| 2011/0019962 A1* | 1/2011 | Childers et al. ................. 385/76 |
| 2011/0081798 A1* | 4/2011 | Koreeda et al. ............... 439/374 |
| 2012/0057824 A1* | 3/2012 | Katoh .............................. 385/71 |
| 2012/0057826 A1* | 3/2012 | Katoh .............................. 385/78 |
| 2012/0082416 A1* | 4/2012 | Katoh .............................. 385/72 |
| 2012/0099822 A1* | 4/2012 | Kuffel et al. ..................... 385/78 |

FOREIGN PATENT DOCUMENTS

| | | |
|---|---|---|
| JP | 10-288722 A | 10/1998 |
| JP | 2006-243124 A | 9/2006 |
| JP | 2008020567 A | 1/2008 |

* cited by examiner

OPTICAL CONNECTOR, CONNECTOR ADAPTER, OPTICAL FIBER LINE, AND OPTICAL COMMUNICATION SYSTEM

Priority is claimed on Japanese Patent Application No. 2010-222800, filed Sep. 30, 2010, the contents of which are incorporated herein by reference.

BACKGROUND OF THE INVENTION

1. Field of the Invention

The present invention relates to an optical connector, an optical fiber line, and an optical communication system, and more particularly, to an optical connector that is inserted into an opening of a connector adapter and that is connected to another optical connector inserted into the other opening, a connector adapter to which the optical connector can be inserted and coupled, an optical fiber line that optically connects optical fibers using the optical connector and the connector adapter, and an optical communication system.

2. Description of the Related Art

An optical connector having a slide lock structure and being coupled to a connector adapter or the like in a push-on manner has been widely diffused.

An example of such a type of optical connector is an MPO type optical connector (an F13 type optical connector defined in the JIS C5982 or an optical connector defined in the IEC 61754-7; MPO: Multi-fiber Push On) (for example, see Japanese Unexamined Patent Application Publication No. H10-206689, "F13 TYPE MULTI-CORE OPTICAL FIBER CONNECTOR C5982: 1997, JIS Handbook Electronic Test Method/Optoelectronics Part, published by Japanese Standards Association, Apr. 24, 1998", and "IEC 61754-7 Fiber Optic Connector Interface Part 7: Type MPO Connector Family").

SUMMARY OF THE INVENTION

Optical connectors having a variety of configurations have been developed.

There exists an optical connector (hereinafter, also referred to as "nonstandard optical connector") of which the external structure and the coupling structure to a connector adapter are the same as an optical connector (hereinafter, also referred to as "standard optical connector") having the standard structure defined for example in the JIS or the IEC standard, but of which the internal structure, the mechanical characteristics, and the like are different from the standard ones.

The nonstandard optical connector has the same external structure as the standard optical connector and thus they cannot be visually distinguished from each other.

Since the nonstandard optical connector can be inserted into and coupled to the same connector adapter as the standard optical connector, the nonstandard optical connector can be inserted into a connector adapter, thereby causing erroneous connection to the standard optical connector.

Accordingly, it is difficult to use the nonstandard optical connector as distinct from the standard optical connector.

An MPO type optical connector will be described below as an example.

Regarding the MPO type optical connector, the number of cores defined in the JIS is 12 cores, but 24-core and 48-core MPO type optical connectors (hereinafter, referred to as "24 MPO and 43 MPO") in which optical fibers are two-dimensionally arranged have been developed.

The basic structure other than a ferrule of the 24 MPO and 48 MPO (hereinafter, also abbreviated as 24 and 48 MPOs) is based on the JIS or the IEC standard.

The 24 and 48 MPOs can be connected using a standard connector adapter defined in the standard.

However, in the 24 and 48 MPOs, the spring pressure defined in the IEC standard is not sufficient as a spring pressure of a built-in spring pressing the ferrule to realize stable physical contact (PC) coupling of end faces of the optical fibers exposed from the end face of the ferrule.

Accordingly, in order to realize the stable PC coupling, it is necessary to raise the spring pressure of the 24 and 48 MPOs.

However, when the 24 and 48 MPOs (nonstandard optical connectors) having the raised spring pressure are assembled using the same components (components other than a spring) as the 24 and 48 MPOs (standard optical connectors) of which the spring pressure is defined in the IEC standard, the nonstandard optical connectors are not visually distinguishable from the standard 24 and 48 MPOs.

In this case, when it is intended to connect the 24 and 48 MPOs having a spring pressure sufficient to realize the PC coupling, the 24 and 48 MPOs having a spring pressure defined in the IEC may be connected to the 24 and 48 MPOs having an enhanced spring pressure.

The invention is made in consideration of the above-mentioned circumstances

A goal of the invention is to provide an optical connector that can realize its use as distinct from a standardized optical connector at a low cost, a connector adapter to which the optical connector can be inserted and coupled, an optical fiber line in which optical fibers are coupled using the optical connector and the connector adapter, and an optical communication system.

To achieve the above-mentioned goal, the invention provides the following configurations.

A first invention provides an optical connector including a housing that receives a ferrule and a coupling into which the housing is inserted.

Additionally, a connecting end face includes one or more protruding portions protruding and one or more recessed portions depressed relative to a reference plane corresponding to a reference face of a coupling of a standardized optical connector.

A second invention provides the optical connector according to the first invention, further including a key protruding from a side surface of the housing and extending in a connector length direction.

Additionally, the coupling includes one or more the protruding portions or the recessed portions on the side of the key.

A third invention provides the optical connector according to the second invention.

Additionally, the connecting end face of the coupling includes the recessed portions just above the key and the protruding portions on at least one side in the width direction of the recessed portions.

A fourth invention provides the optical connector according to the second or third invention.

Additionally, the connecting end face of the coupling includes one or more the protruding portions or the recessed portions on the opposite side of the key.

A fifth invention provides a connector adapter to which the optical connector is to be inserted and coupled, the connector adapter according to any one of the first to fourth inventions can be inserted and coupled.

In addition, the connector adapter includes an opening end portion into which the optical connector is inserted, the opening end portion including one or more adapter protrusions protruding and one or more adapter recesses depressed relative to an adapter reference plane, an adapter reference plane corresponding to an adapter reference face coming in contact with the reference face of the coupling of the standardized optical connector in a connector adapter to which the standardized optical connector is inserted and coupled Additionally, the optical connector is to be coupled to the connector adapter by inserting the protruding portions of the connecting end face of the coupling into the adapter recesses and by receiving the adapter protrusions in the recessed portions of the connecting end face.

A sixth invention provides an optical fiber line and a connector coupling section in which optical fibers are coupled to each other using the optical connector according to any one of the first to fourth inventions and the connector adapter according to the fifth invention.

A seventh invention provides an optical communication system including optical fibers coupled to each other using the optical connector according to any one of the first to fourth inventions attached to an end of the optical fibers and using the connector adapter according to the fifth invention.

An eighth invention provides the optical communication system according to the seventh invention.

Additionally, the optical connectors to be identified differ from each other in the number of at least one of the protruding portions and recessed portions of the coupling.

A ninth invention provides the optical communication system according to the seventh or eighth invention.

Additionally, the optical connectors to be identified differ from each other in the number of at least one of the protruding portions and recessed portions of the coupling.

A tenth invention provides the optical communication system according to any one of the seventh to ninth inventions.

Additionally, the optical connectors to be identified differ from each other in the color of at least a part of the optical connectors.

An eleventh invention provides the optical communication system according to the tenth invention.

Additionally, the optical connectors to be identified differ from each other in the color of the coupling.

Since the optical connector according to the invention employs the coupling having the connecting end face in which the protruding portions and the recessed portions are formed relative to the reference plane corresponding to a reference face of a coupling of a standardized optical connector (hereinafter, also referred to as a standard optical connector), it is possible to restrict the fitting (coupling) to a connector adapter (standard connector adapter) for the standard optical connector.

That is, since the optical connector can restrict the fitting (coupling) to a standard connector adapter with a simple configuration at a low cost, it is possible to realize its use as distinct from a standard optical connector at a low cost.

The connector adapter according to the invention can be used in connection between the optical connectors and can restrict the fitting (coupling) of the standard optical connector.

Accordingly, when the connector adapter is configured so that it can be used in connection between the optical connectors according to the invention which are inserted and coupled from both ends of the connector adapter, it is possible to effectively contribute to prevention of erroneous connection between the optical connector according to the invention and a standard optical connector.

As a result, in the optical fiber line and the optical communication system in which optical fibers are connected to each other using the optical connector and the connector adapter according to the invention, it is possible to realize use of the optical connector according to the invention as distinct from a standard optical connector.

BRIEF DESCRIPTION OF THE DRAWINGS

FIG. 1A is a perspective view as seen from a side (top side) of a housing having a key and FIG. 1B is a perspective view as seen from a bottom side opposite to the top side of the housing having a key.

FIG. 14A shows a state before coupling (fitting) the optical connector to the connector adapter and FIG. 14B shows a state at the time of coupling (fitting).

FIG. 15A shows a state before coupling (fitting) the optical connector to the connector adapter and FIG. 15B shows a state at the time of coupling (fitting).

DETAILED DESCRIPTION OF THE INVENTION

Hereinafter, a first embodiment of the invention will be described with reference to the accompanying drawings.

Figure 1A:
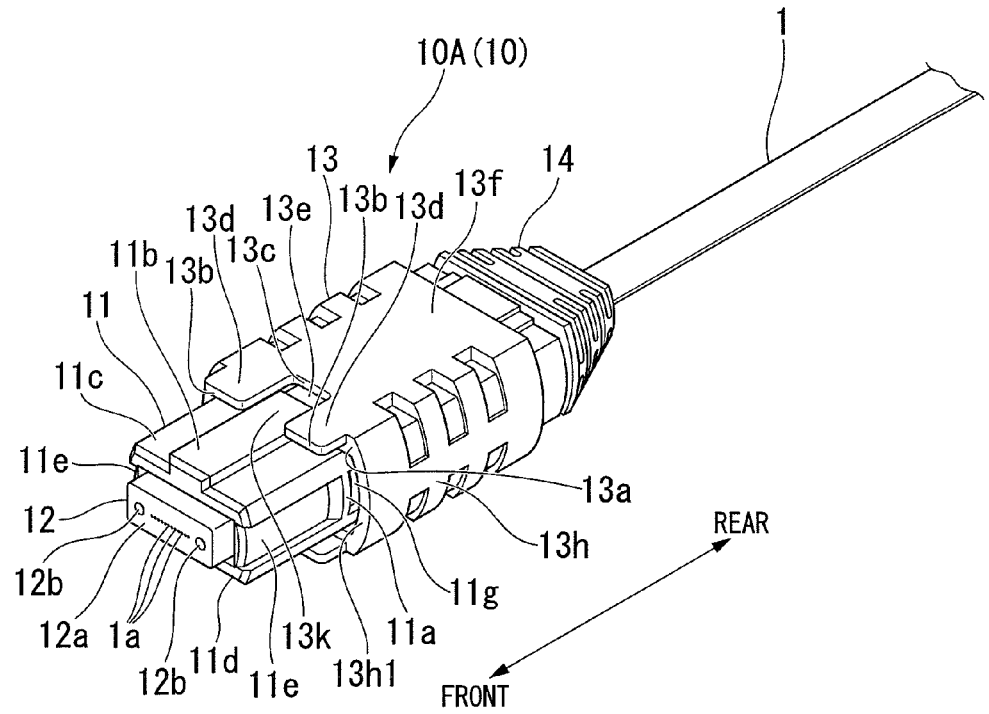
FIGS. 1A and 1B are diagrams illustrating an external structure of an optical connector (MPO type optical connector) according to a first embodiment of the invention, where
Figure 1B:
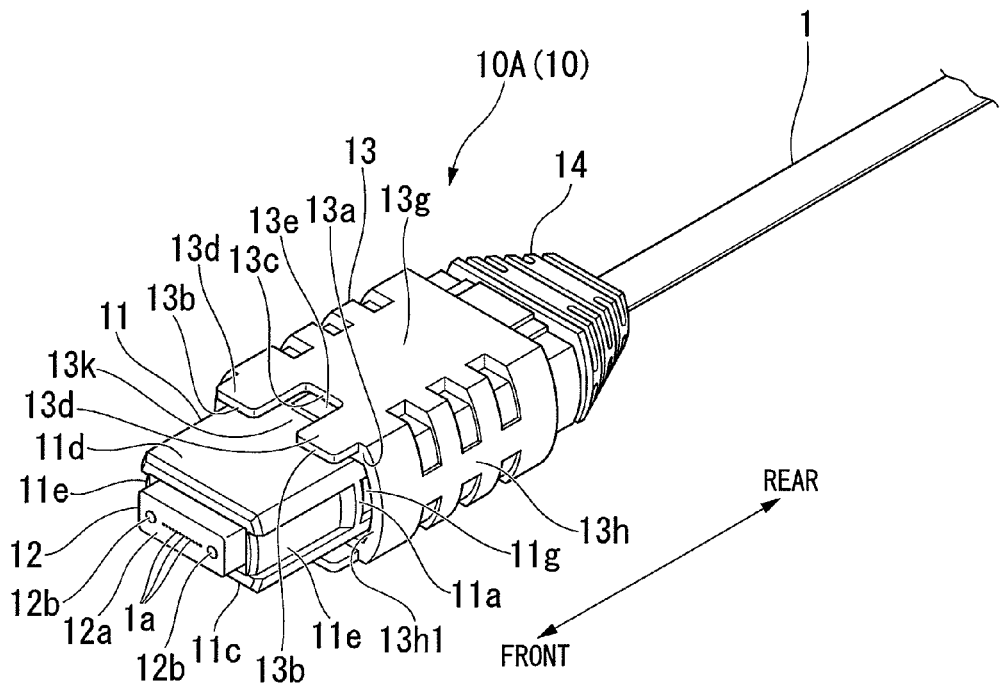

As shown in FIGS. 1A and 1B, an optical connector 10 according to this embodiment has the same configuration as an optical connector 50 (see FIGS. 19 and 20) to be described later which is a standardized MPO type optical connector based on the JIS C5982 or the IEC 61754-7, except for a coupling.

The constituent elements other than the coupling 13 of the optical connector 10 are the same as the optical connector 50.

In this specification, the optical connector 10 is treated as an MPO type optical connector.

Here, the optical connector 50 which is a standardized MPO type optical connector based on the JIS C5982 or the IEC 61754-7 is an example of a standardized optical connector.

In this embodiment, the side of the optical connector 10 in which a ferrule 12 at an end (front end) of a sleeve-like housing 11 is disposed is defined as a front side and the opposite side thereof is defined as a rear side as indicated by arrows in FIGS. 1A and 1B.

In the optical connector 10, the ferrule 12 attached to an end of an optical fiber 1 is received in an end (front end) of the sleeve-like housing 11.

In the optical connector 10, a spring 15 (see FIG. 5) elastically impelling the ferrule 12 to the front side of the connector is disposed in the housing 11.

The optical connector 10 further includes a tubular coupling 13 into which the housing 11 is inserted and which is disposed to be slidable within a movable range guaranteed in an axis line direction relative to the housing 11 and a boot 14 that is attached to a rear end portion opposite to the front end portion of the housing 11 in which the ferrule 12 is disposed.

The optical connector 10 shown in the drawing is attached to an end of the optical fiber 1.

The optical fiber 1 is inserted into the tubular boot 14 and is guided into the housing 11 of the optical connector 10.

The optical fiber 1 extends from the rear end of the boot 14.

The optical connector 10 is a plastic connector assembled using the housing 11, the ferrule 12, the coupling 13, and the boot 14, which are plastic-molded products.

The housing 11 has a structure based on the JIS C5982 or the IEC 61754-7.

In the ferrule 12, the end portion in which a butt-joint end face 12a (contact end face) is formed protrudes from the front end of the housing 11.

However, the ferrule 12 can be pushed into the rear side of the housing 11 against the elastic impelling force of the spring in the housing 11.

The ferrule 12 employs an MT type optical connector (an F12 type optical connector defined in the JIS c 5981, MT: Mechanically Transferable).

The MT type optical connector may be based on the IEC 61754-5.

In this embodiment, a 12-core optical fiber tape is employed as the optical fiber 1.

Herein, the ferrule 12 is a 12-core MT type optical connector attached to an end of the 12-core optical fiber tape (optical fiber 1).

As shown in FIGS. 1A and 1B, the ferrule 12 of the optical connector 10 has a plate-like shape having a rectangular end face 12a.

Figure 5:
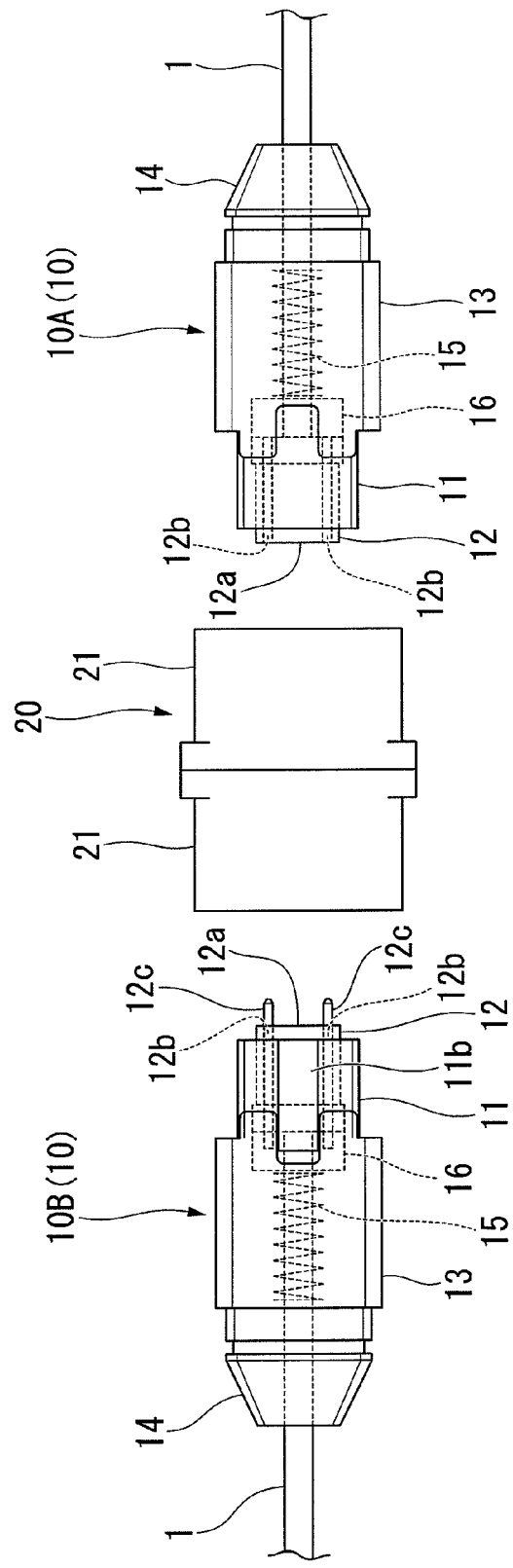
FIG. 5 is a plan view (a model diagram) illustrating the optical connector (an F type optical connector) shown in FIG. 1 and an optical connector (an M type optical connector) having a configuration in which guide pins are disposed in the optical connector.

As shown in FIG. 5, a pair of guide pin holes 12b passing through the ferrule 12 from front to rear is formed at both end portions in the width direction parallel to the length direction of the end face 12a of the ferrule 12.

In the end face 12a of the ferrule 12, ends of 12 bare optical fibers 1a interfering with the end of the optical fiber 1 (optical fiber tape) and being fixed to the ferrule 12 are exposed between the pair of guide pin holes 12b.

The ends of the bare optical fibers 1a exposed from the end face 12a of the ferrule 12 are arranged in a line in the spacing direction of the pair of guide pin holes 12b.

The number of cores of the optical fiber tape used as the optical fiber 1 is not limited to 12, and may be, for example, 2, 4, or 8.

The number of cores of the ferrule 12 (MT type optical connector) corresponds to the number of cores of the optical fiber tape.

As shown in FIG. 5, the optical connectors 10 are classified into two types of an F type optical connector 10A having a configuration in which the front ends of the pair of guide pin holes 12b are opened in the end face 12a of the ferrule 12 and an M type optical connector 10B in which guide pins 12c to be inserted and fitted into the pair of guide pin holes 12b of the ferrule 12 of the F type optical connector 10A protrude from the end face of the ferrule 12.

FIGS. 1A and 1B show the F type optical connector 10A.

The M type optical connector 10B is the same as the F type optical connector 10A, except that it includes a pair of guide pins 12c.

As shown in FIG. 5, the optical connectors 10 are inserted into the connector adapter 20 (hereinafter, also simply referred to as "adapter") from both ends thereof, respectively, and the end faces 12a of the ferrules 12 are butt jointed to each other, whereby the connection coupling between the optical fibers 1 can be realized.

Here, one of the pair of optical connectors 10 inserted into the adapter 20 and connected to each other is an F type optical connector 10A and the other thereof is an M type optical connector 10B.

The optical connectors 10A and 10B inserted into the adapter 20 from both ends thereof are connected to each other by inserting and fitting portions, which protrude from the end face of the ferrule 12, of the pair of guide pins 12c of the M type optical connector 10B into the empty guide pin holes 12b, which are opened from the end face 12a of the ferrule 12, of the front end of the F type optical connector 10A and butt jointing the ferrules 12.

At this time, a pair of guide pins 12c performs a function of positioning the ferrules 12 of the optical connectors 10A and 10B with high accuracy.

As a result, the optical connectors 10A and 10B are butt jointed to each other in a state where the bare optical fibers 1a exposed from the end face 12a of the ferrules 12 are positioned with high accuracy, thereby connector-coupling (optically connecting) the optical fibers 1.

The guide pins 12c of the M type optical connector 10B are fixed and locked to a pink lamp 16 disposed between the ferrule 12 and the spring 15 disposed in the back thereof.

In the F type optical connector 10A, a pink lamp 16 is disposed between the ferrule 12 and the spring 15 so as to set the spring pressure of the spring 15 to be equal to that of the M type optical connector 10B.

Here, in the F type optical connector 10A, a spacer that can maintain the distance between the ferrule 12 and the spring 15 so as to be equal to that in the case where the pink lamp 16 is disposed therebetween may be used instead of the pink lamp 16.

In the F type optical connector 10A, the spring 15 may come in direct contact with the rear end of the ferrule 12 so as to elastically impel the ferrule 12 to the connector front side.

Specifically, the spring 15 is a coil spring.

In the optical connector 10 shown in FIG. 5, the optical fiber 1 is inserted into the spring 15 and the spring is interposed between a spring bearing not shown and disposed in the housing 11 and the pink lamp 16 in the front thereof.

A fiber insertion portion that is a groove or a through-hole passing the optical fiber 1 is formed in the pink lamp 16.

The pink lamp 16 is interposed between the ferrule 12 and the spring 15 in the state where the optical fiber 1 is received in the fiber insertion portion.

Figure 2:
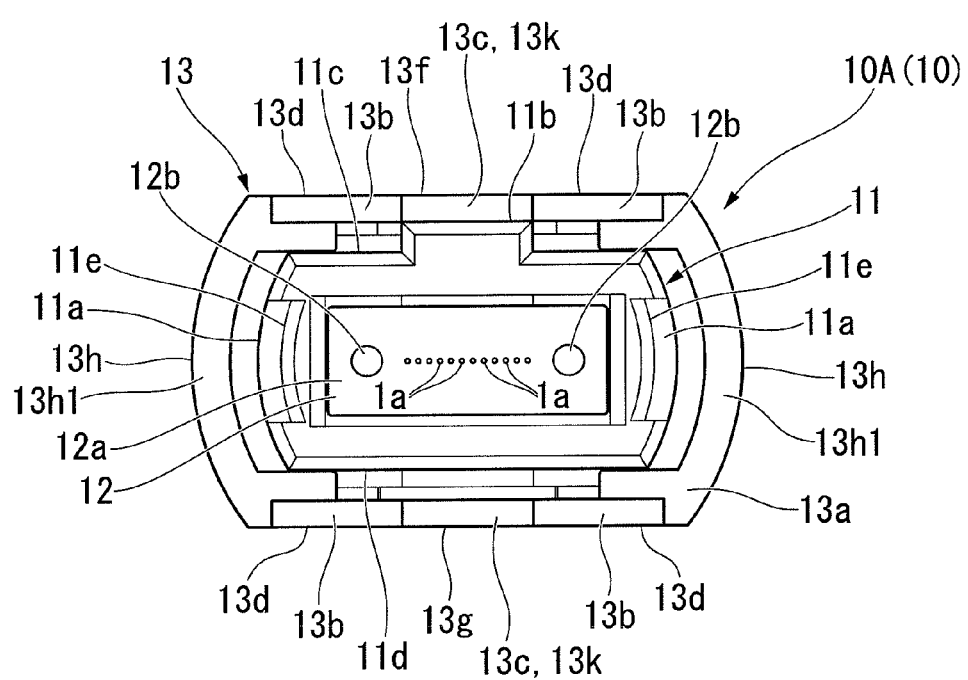
FIG. 2 is a diagram illustrating a structure of the optical connector as seen from the front side thereof.

As shown in FIGS. 1A, 1B and 2, in the housing 11 of the optical connector 10, a section (hereinafter, also referred to as a cross-section) perpendicular to the axis line direction thereof has a long and thin (flat) sleeve shape.

The housing 11 has a configuration in which both main wall portions 11c and 11d (an upper wall portion 11c and a lower wall portion 11d) having a long plate shape and being parallel to each other are bridged to each other by side wall portions 11e on both ends in the length direction of the cross-section.

The distance between the pair of side wall portions 11e is greater than the distance between the pair of main wall portions 11c and 11d.

As shown in FIGS. 1A, 1B, and 2, a section (hereinafter, also referred to as a cross-section) perpendicular to the axis line direction of the coupling 13 has a long and thin (flat) tubular shape.

The housing 11 is inserted into the coupling in a state where the length direction of the cross-section is set to be parallel to the length direction of the cross-section of the housing 11.

The coupling 13 has a configuration in which two face plate portions 13f and 13g (an upper plate portion 13f and a lower plate portion 13g) parallel to each other are bridged to each other by side plate portions 13h at both ends of the length direction of the cross-section thereof.

In this description, the upside of the optical connector 10 is defined as the top and the downside is defined as the bottom in FIGS. 1A and 2.

In this description, the length direction of the cross-section of the housing 11 and the coupling 13 in the optical connector 10 is defined as a "width direction" and the short side direction perpendicular to the length direction of the cross-section is defined as a "thickness direction".

As shown in FIGS. 1A, 1B and 2, the front end faces of a pair of side plate portions 13h are perpendicular to the center axis direction of the coupling 13.

The front end face (the connecting end face) of the coupling 13 includes a reference end face 13a that is formed perpendicular to the center axis direction of the coupling 13 and that includes the front end faces 13h1 of the pair of side plate portions 13h, protruding portions 13b protruding to the connector front side from the referenced end face 13a, and recessed portions 13c depressed to the connector rear side from the reference end face 13a.

The protrusions 13d forming the protruding portions 13b of the front end face and cutouts 13e forming the recessed portions 13c of the front end face are formed at the front end of the coupling 13.

The protrusions 13d and the cutouts 13e are all formed in the face plate portions 13f and 13g of the coupling 13.

The protrusions 13d protrude to the connector front side from a coupling reference plane 13i which is a virtual plane (see FIG. 5) overlapping with the reference end face 13a perpendicular to the center axis line of the coupling 13.

The cutouts 13e are recessed places depressed to the connector rear side from the coupling reference plane 13i.

The protruding portions 13b in the front end face of the coupling 13 indicate protrusion shaped portions formed by the outer end faces of the protrusions 13d among the front end face of the coupling 13.

The recessed portions 13c indicate recess shaped portions formed by the inner circumferential surfaces of the cutouts 13e in the front end face of the coupling 13.

Figure 19:
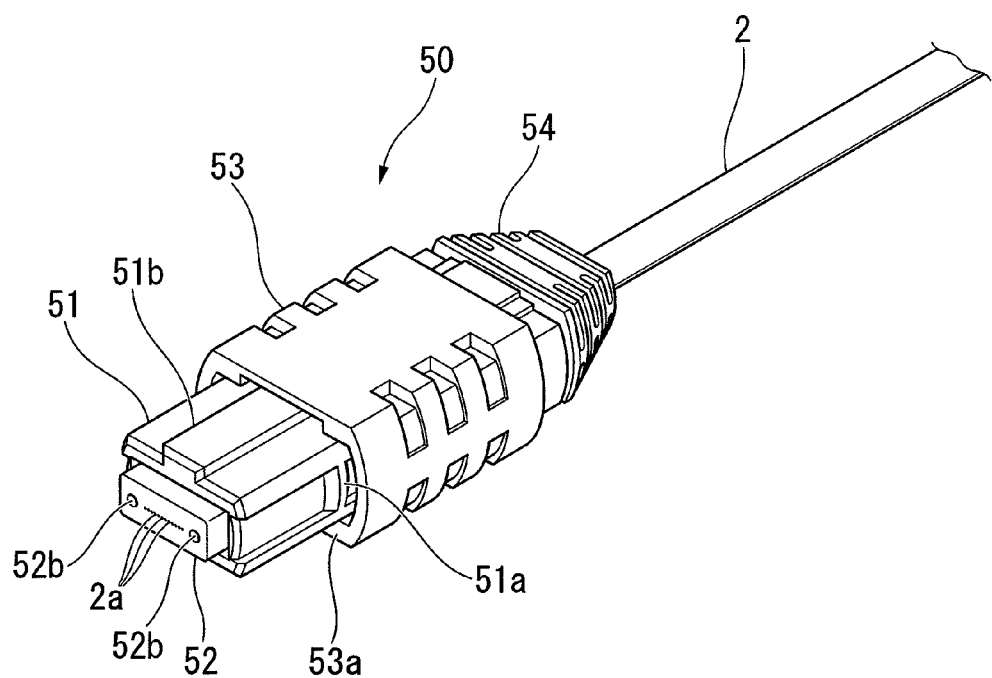
FIG. 19 is a perspective view illustrating a standard optical connector shown in FIGS. 12 and 13.
Figure 22:
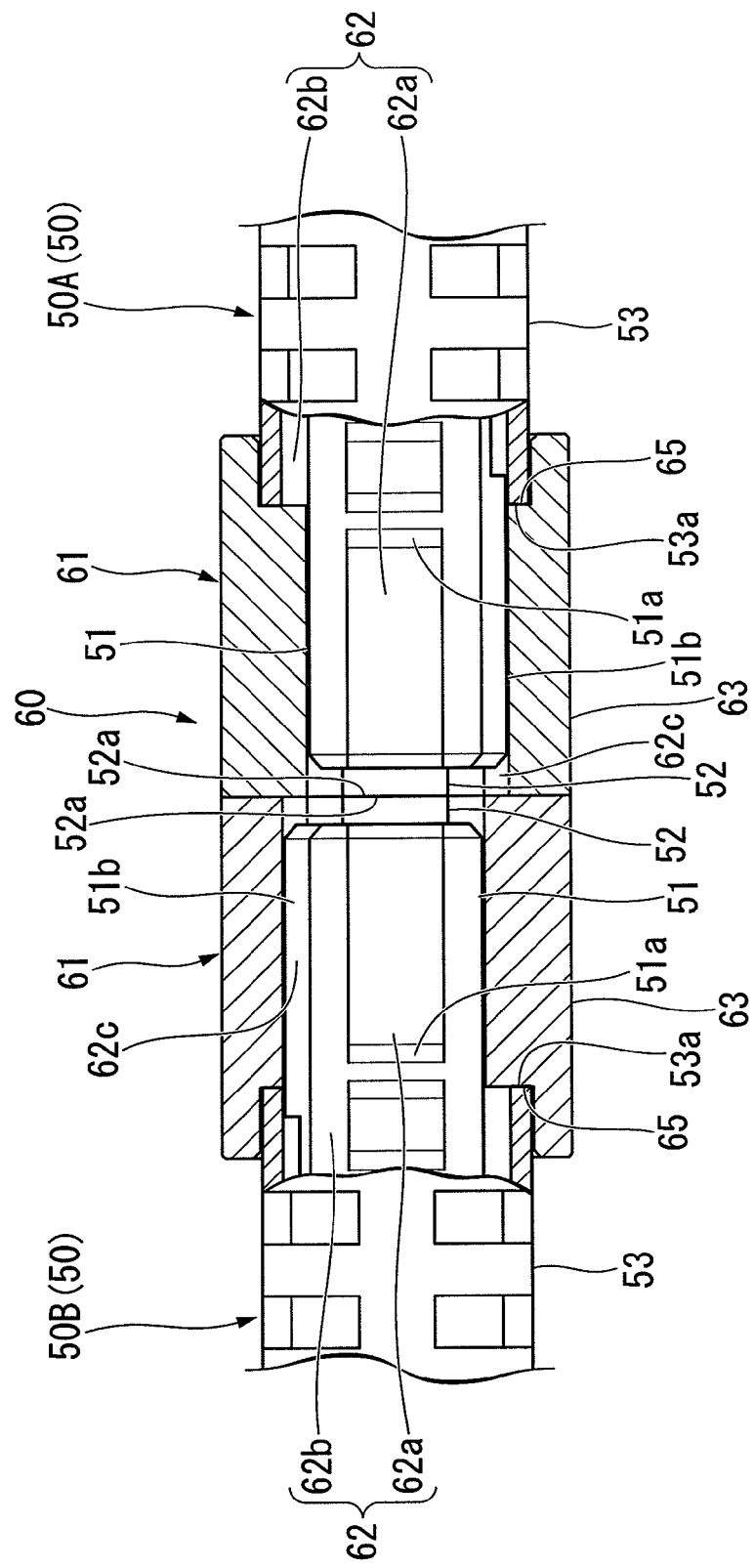
FIG. 22 is a front sectional view illustrating a state in which the standard optical connectors shown in FIG. 20 are connected to each other using a standard connector adapter.

As shown in FIGS. 19 and 22, the coupling 53 of the standardized optical connector 50 (hereinafter, also referred to as the standard optical connector) based on the JIS standard (JIS C5982) or the IEC standard (IEC 61754-7) has a front end face 53a (reference face) perpendicular to the center axis direction of the coupling 53.

On the contrary, the optical connector 10 is different from the standardized optical connector 50, in that the coupling 13 has the configuration in which the protruding portions 13b protruding to the connector front side and the recessed portions 13c depressed to the connector rear side relative to the coupling reference plane 13i.

The position (the position relative to the housing 11) of the reference end face 13a of the coupling 13 in the optical connector is the same as the position (the position of the standard optical connector 50 relative to the housing 51) of the front end face 53a of the coupling 53 in the standard optical connector 50.

The front end face of the coupling 13 of the optical connector 10 includes the protruding portions 13b protruding to the connector front side from the coupling reference plane 13i corresponding to the front end face 53a (the reference face) of the coupling 53 of the standard optical connector 50 and the recessed portions 13c depressed to the connector rear side from the coupling reference plane 13i.

The coupling 13 is elastically impelled to the connector front side relative to the housing 11 by a coupling spring not shown but disposed inside the coupling.

Stopper contact protrusions 13j (see FIG. 9) coming in contact with front stopper protrusions 11f (see FIG. 9) protruding from the outer circumferential surface of the housing 11 from the front side protrudes inside the coupling 13.

Specifically, the stopper contact protrusions 13j of the coupling 13 protrude from the face plate portions 13f and 13g of the coupling 13.

Specifically, the front stopper protrusions 11f of the housing 11 protrude from the main wall portions 11c and 11d of the housing 11.

The coupling 13 is located at a front movement limit position at which the stopper contact protrusions 13j come in contact with the front stopper protrusions 11f of the housing 11 by means of the elastic impelling force of the coupling spring.

In FIGS. 1A and 1B, the coupling 13 is located at the front movement limit position.

The coupling 13 is maintained in the state where it is stopped at the front movement limit position by means of the elastic impelling force of the coupling spring, when a displacing force from the front movement limit position to the rear side is not given to the housing 11.

As shown in FIGS. 1A and 1B, the coupling 13 is located at a position moving to the connector rear side from the front end of the housing 11 when it is located at the front movement limit position.

The coupling 13 can be manually moved to slide against the elastic impelling force of the coupling spring from the front movement limit position to the connector rear side relative to the housing 11.

The coupling 13 having moved from the front movement limit position to the connector rear side is restored to the front movement limit position by means of the elastic impelling force of the coupling spring, when the displacing force to the connector rear side relative to the housing 11 is removed (unloaded).

Figure 7:
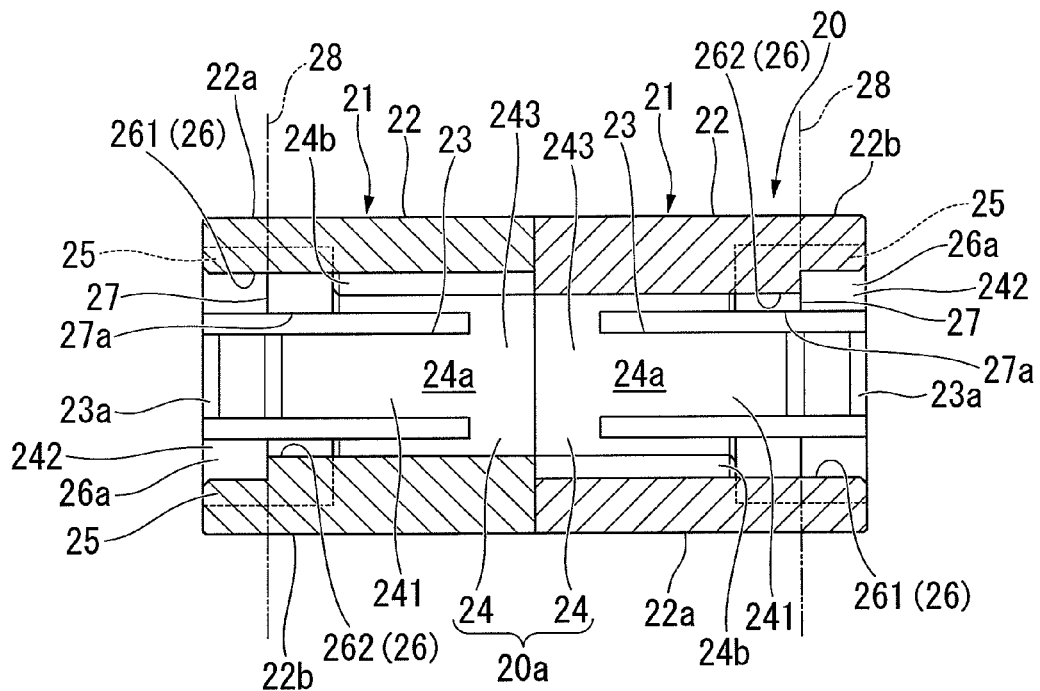
FIG. 7 is a front sectional view illustrating the internal structure of the connector adapter shown in FIG. 3.
Figure 8:
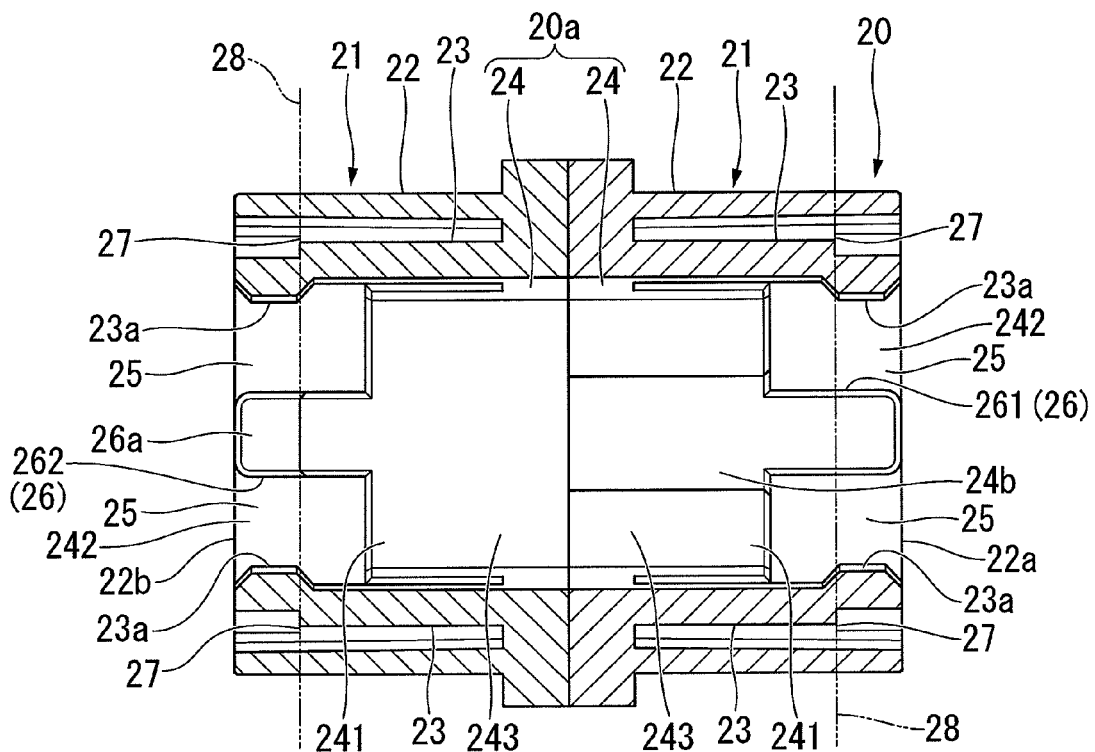
FIG. 8 is a horizontal sectional view illustrating the internal structure of the connector adapter shown in FIG. 3.

FIGS. 7 and 8 illustrate an adapter 20 used to connect the optical connectors 10 (the F type optical connector 10A and the M type optical connector 10B).

Figure 3:
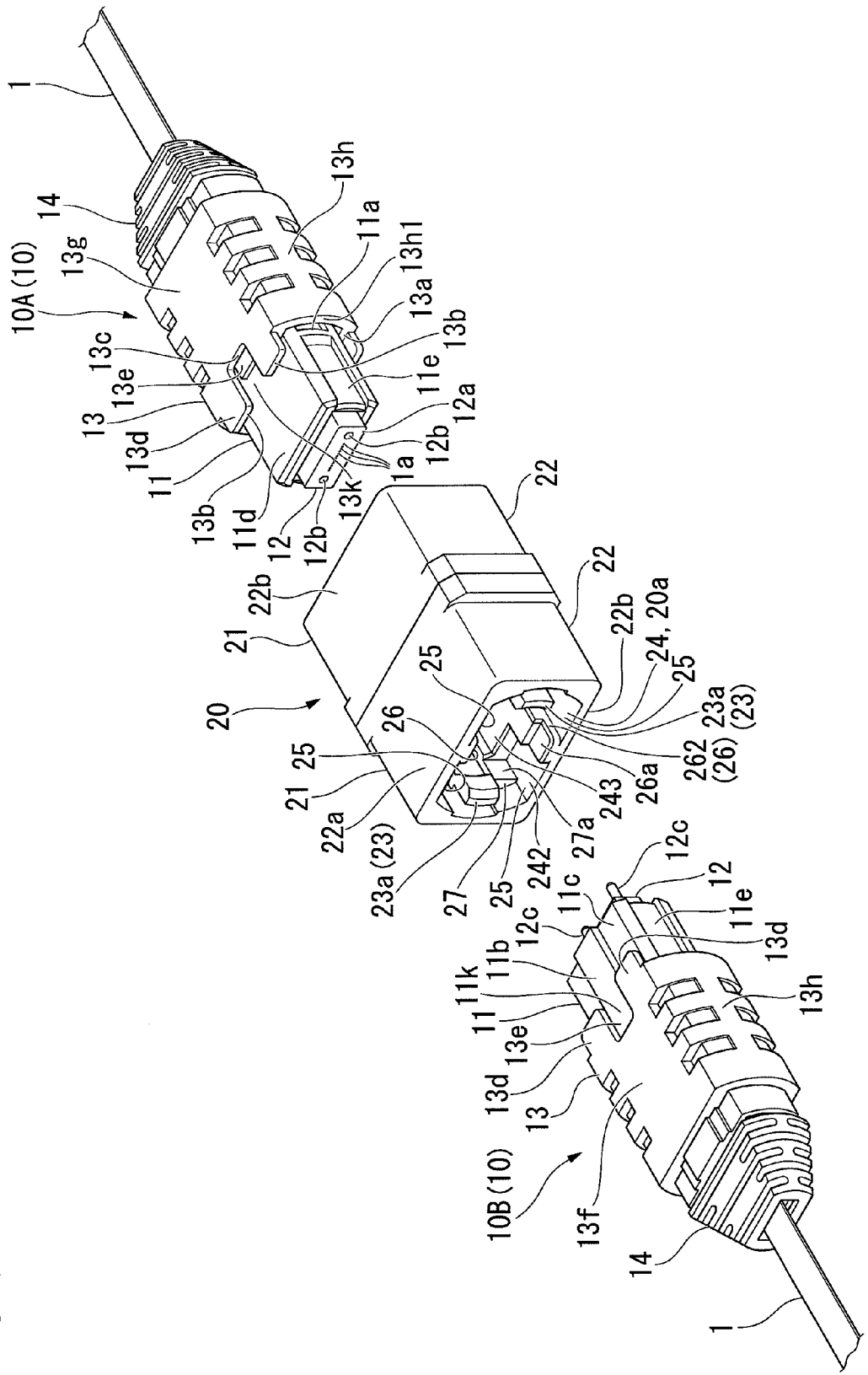
FIG. 3 is a diagram illustrating a connector adapter according to the first embodiment of the invention (a connector adapter according to the invention) to which the optical connector shown in FIGS. 1A and 1B can be inserted and coupled, where an adapter protrusion and an adapter recess corresponding to a protruding portion and a recessed portion on the bottom surface of the optical connector.
Figure 4:
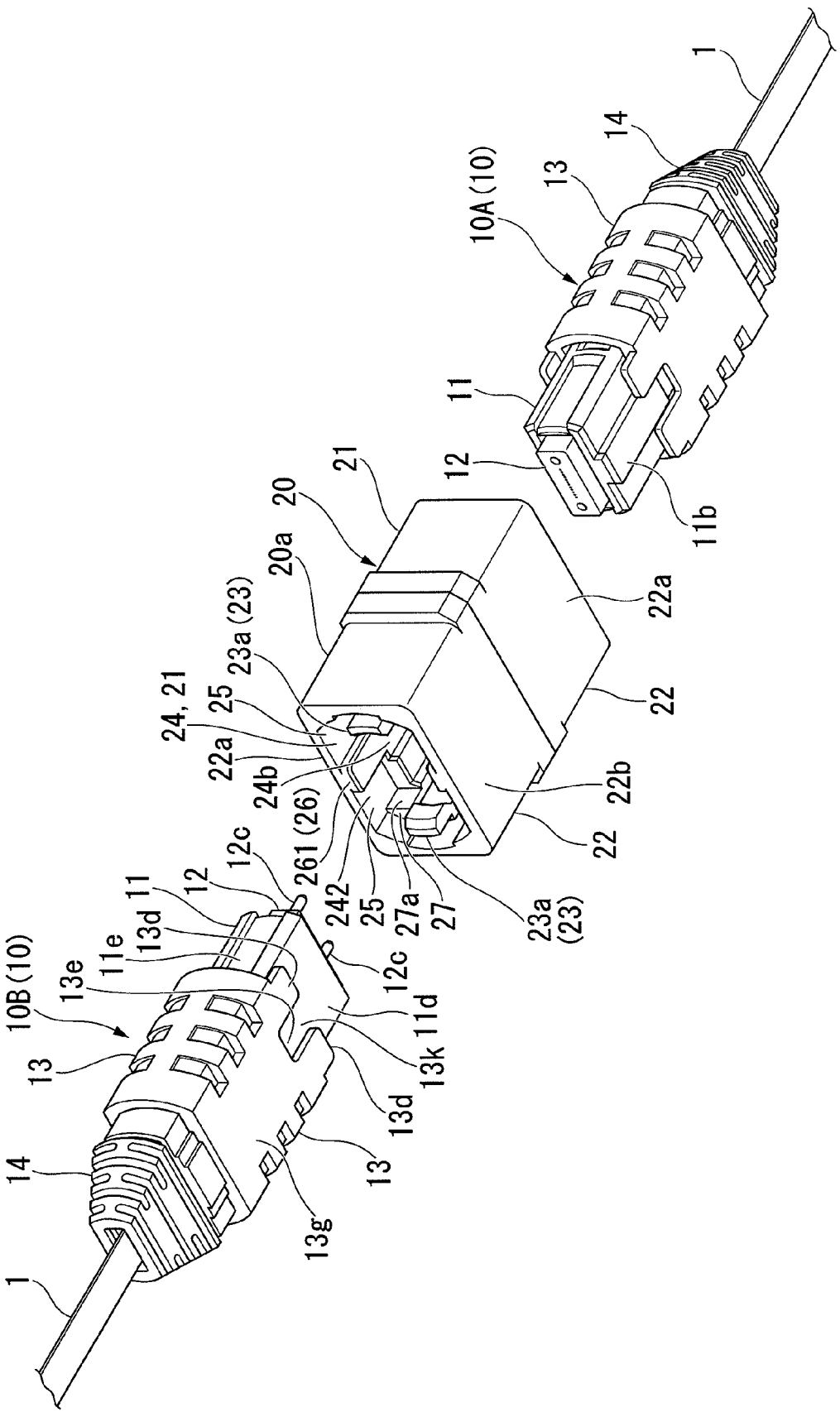
FIG. 4 is a perspective view illustrating an adapter protrusion and an adapter recess, corresponding to a recessed portion and a protruding portion on the top surface of the optical connector, of the connector adapter shown in FIG. 3.

As shown in FIGS. 3 and 4, the optical connector 10 can be inserted into the connector insertion hole 20a formed to pass through the adapter 20 from the front end, whereby the optical connector can be coupled (fitted) to the adapter 20 in a push-on manner.

As shown in FIGS. 7 and 8, the adapter 20 includes a pair of adapter half bodies 21 having the same configuration and being assembled into a body.

Each adapter half body 21 has a schematic structure in which a pair of elastic engagement pieces 23 locking the optical connector 10 inserted into the connector fitting hole 24 to the adapter half body 21 protrudes inside a tubular connector receiving housing 22 through which the connector fitting hole 24 is formed.

The elastic engagement piece 23 is formed of a thin and long piece extending from one end in the axis line direction of the connector receiving housing 22 to the other end.

Two elastic engagement pieces 23 are separated from each other inside the connector fitting hole 24 and extend along the inner surface of the connector fitting hole 24.

Two adapter half bodies 21 are formed in a body by bringing the end portions (end portions in the axis line direction, hereinafter, also referred to as base end portions) on the side in which the elastic engagement pieces 23 of the connector receiving housings 22 protrude into contact with each other and cause the connector fitting holes 24 inside the connector receiving housing 22 to communicate with each other.

The adapter 20 includes a tubular adapter housing in which the connector receiving housings 22 of two adapter half bodies 21 are formed in a body.

The connector receiving housing 22 of the adapter half body 21 is also referred to as a half-body housing.

The connector insertion hole 20a of the adapter 20 is formed by causing the connector fitting holes 24 of the adapter half bodies 21 to communicate with each other.

In the adapter 20, the front end portions opposite to the base end portions of the half-body housings 22 of two adapter half bodies 21 are formed of openings at both ends in the axis line direction of the connector insertion hole 20a.

The optical connectors 10 can be inserted into the connector insertion hole 20a from the openings.

In this description, the openings are treated as openings used to insert the optical connectors into the connector fitting holes 24 in the adapter half bodies 21 of the adapter 20.

In this description, the openings are also referred to as fitting-hole openings and the end portion opposite to the base end portion of the half-body housing 22 in each adapter half body 21 is also referred to as an opening end portion (or half-body opening end portion).

Since both end portions in the axis line direction of the adapter 20 are the opening end portions of the adapter half bodies, both end portions in the axis line direction of the adapter 20 may be referred to as the opening end portions.

As shown in FIGS. 3 and 4, the optical connector 10 can be coupled to the adapter half body 21 by pushing the optical connector into the connector fitting hole 24 from the opening end portion of the adapter half body 21.

Figure 9:
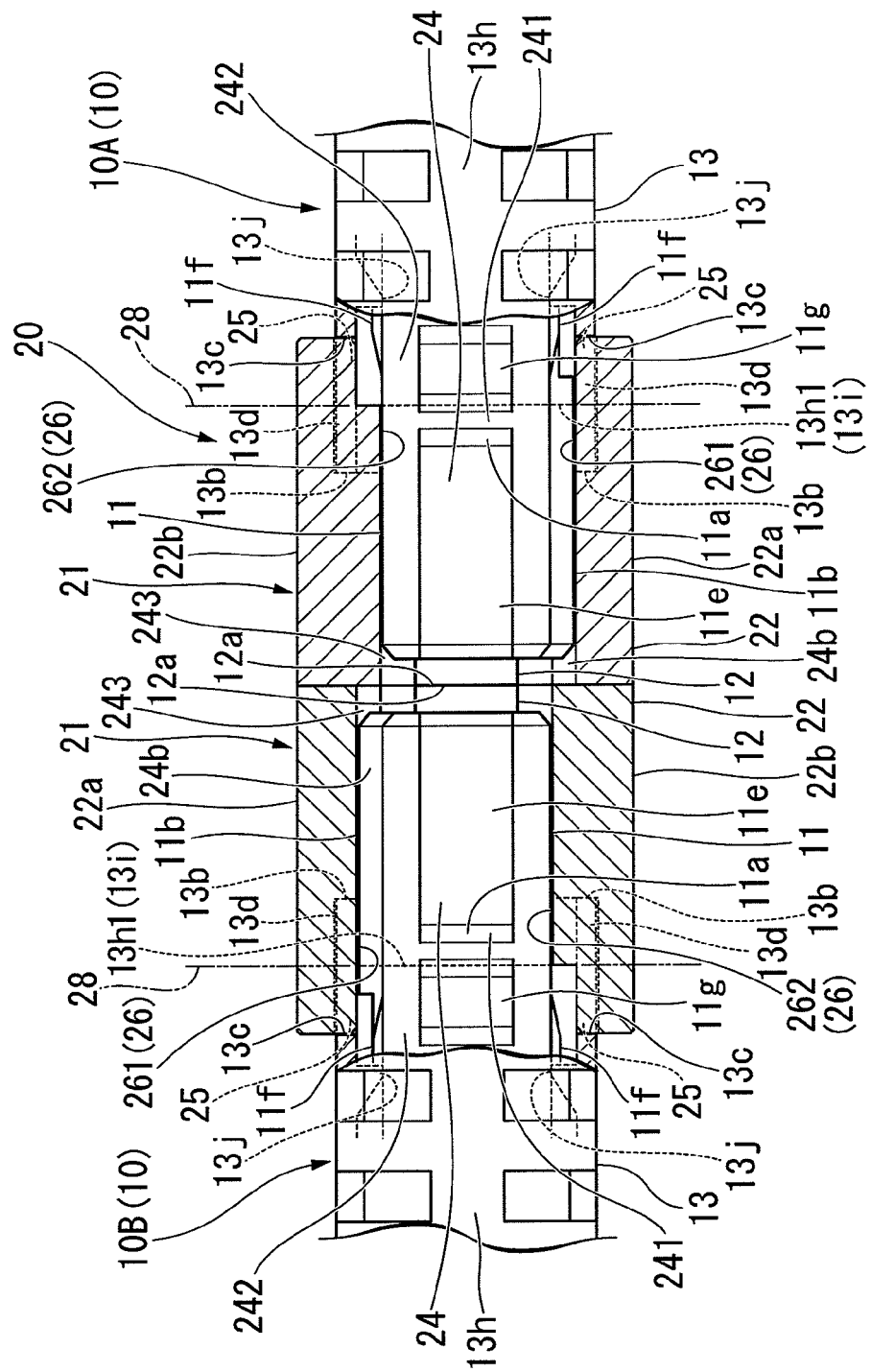
FIG. 9 is a front sectional view illustrating a state in which the optical connectors shown in FIG. 1 are connected (coupled) to each other using the connector adapter shown in FIG. 3.

As shown in FIGS. 4 and 9, the optical connector 10 is inserted into the adapter half body 21 by inserting a reverse-insertion preventing key 11b protruding from the outer circumferential surface of the housing 11 into a key groove 24b formed in the inner surface of the half-body housing 22 of the adapter half body 21.

The insertion of the optical connector 10 into the adapter half body 21 is carried out by allowing an operator to press a portion of the optical connector 10, which is located in the back of the coupling 13, for example, the boot 14, to touch the adapter half body 21 with his or her finger.

The key 11b of the housing 11 of the optical connector 10 is a ridged portion formed on the upper wall portion 11c of the housing 11 so as to extend along the axis line direction of the housing 11 from the front end of the housing 11.

The key 11b protrudes from the upper wall portion 11c at the center in the width direction of the housing 11.

In this description, the side on which the key 11b is disposed in the optical connector 10 is defined as the upside (the top side) and the opposite side is defined as the downside (the bottom side).

As shown in FIGS. 3 and 4 and FIGS. 6 to 8, the connector fitting hole 24 of each adapter half body 21 positions the optical connector 10 inserted into the connector fitting hole 24 from the opening so that it can butt joint the optical connector inserted into the adapter 20 from the opposite side (the ferrules butt each other).

In the inner surface of the half-body housing 22 of the adapter half body 21 shown in the drawings, grooved adapter recesses 25 into which the protrusions 23d at the front end of the coupling 13 of the optical connector 10 are inserted and are formed to extend from the fitting hole opening to the half-body base end portion (on which the base end portion of the half-body housing 22 is disposed).

Adapter protrusions 26 that are received in the cutouts 13e of the coupling 13 of the optical connector 10 are formed on the inner surface of the half-body housing 22.

Figure 6:
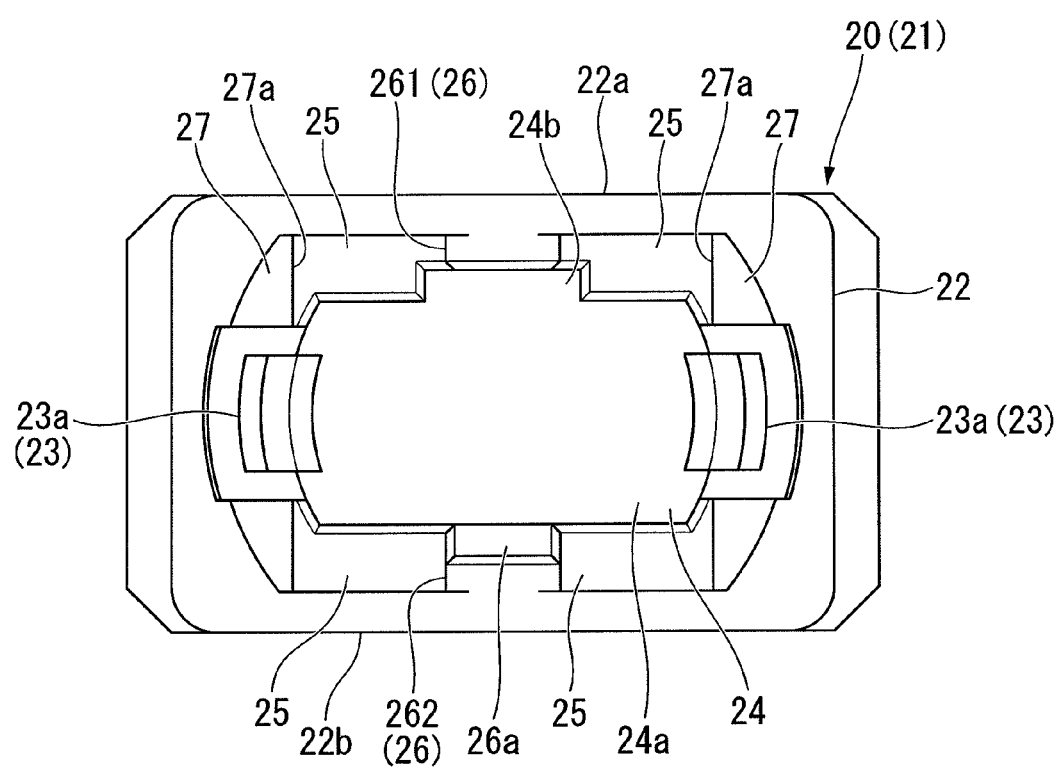
FIG. 6 is a diagram illustrating the structure of the connector adapter shown in FIG. 3 as seen from the opening side of a connector insertion hole.

As shown in FIGS. 3, 4, and 6, protruding wall portions 27a forming coupling contact faces 27, with which the front end faces 13h1 of the side plate portions 13h on both ends in the width direction of the coupling 13 of the optical connector 10 inserted into the connector fitting hole 24 come in contact, protrude from the inner surface of the half-body housing 22.

The section of the connector fitting hole 24 has a thin and long shape of which the length direction is parallel to the spacing direction between a pair of elastic engagement pieces 23.

The protruding wall portions 27a protrude from the inner surface of the half-body housing 22 at both ends in the length direction of the section of the connector fitting hole 24 toward both ends in the short side direction of the section (the up and down direction in FIG. 6) of the connector fitting hole 24 with the elastic engagement pieces 23 interposed therebetween.

The protruding wall portions 27a protrude from four positions of the inner surface of the half-body housing 22.

The protruding wall portions 27a extend from the positions slightly departing from the fitting-hole opening to the half-body base end portion in the vicinity of the half-body opening end toward the half-body base end portion.

The coupling contact face 27 is formed by the end faces of the protruding wall portions 27a facing the fitting-hole opening.

The connector fitting hole 24 of the adapter half body 21 in the drawings includes a housing receiving hole 241 extending from the coupling contact face 27 to the half-body base end portion and an entrance hole portion 242 extending from the coupling contact face 27 to the fitting-hole opening.

The adapter recesses 25 formed in the inner surface of the half-body housing 22 extend from the entrance hole portion 242 to the housing receiving hole 241.

Here, the inner surface of the housing receiving hole 241 includes a positioning hole portion 243, which is a region in which the adapter recesses 25 are not formed, on the side separated to the half-body base end portion from the region in which the adapter recesses 25 are formed.

The positioning hole portion 243 includes neither the adapter recesses 25 nor the adapter protrusions 26.

As shown in FIGS. 6, 7, and 8, the key groove 24b of the adapter half body 21 is formed in the inner surface of the half-body housing 22 so as to extend in the axis line direction of the half-body housing 22.

The key groove 24b is a part of the positioning hole portion 243.

As shown in FIGS. 7 and 8, the housing receiving hole 241 constitutes the entire part, which is deep from the entrance hole portion 242, of the connector fitting hole 24 and the end portion close to the half-body base end portion (close to the base end portion of the half-body housing 22) thereof is the end portion of the connector fitting hole 24 close to the half-body base end portion.

The positioning hole portion 243 of the housing receiving hole 241 includes the key groove 24b and a fitting-hole main hole portion 24a that has a long and thin sectional shape (which is a section perpendicular to the axis line direction) and into which the part of the housing 11 of the optical connector 10 other than the key 11b is inserted.

The key groove 24b is formed by elongating the central portion in the length direction of the section of the fitting-hole main hole portion 24a toward an end in the short side direction (the up and down direction in FIGS. 6 and 7) of the section perpendicular to the length direction of the section of the fitting-hole main hole portion 24a.

Two elastic engagement pieces 23 of the adapter half body 21 are disposed at both ends in the length direction of the section of the connector fitting hole 24.

The ends of two elastic engagement pieces 23 are located in the entrance hole portion 242 of the connector fitting hole 24.

When the optical connector 10 is inserted into and coupled to the adapter half body 21, the key 11b of the housing 11 is inserted into the key groove 24b of the adapter half body 21 and the part of the housing 11 other than the key 11b is inserted between the pair of elastic engagement pieces 23 in the connector fitting hole 24.

Figure 10:
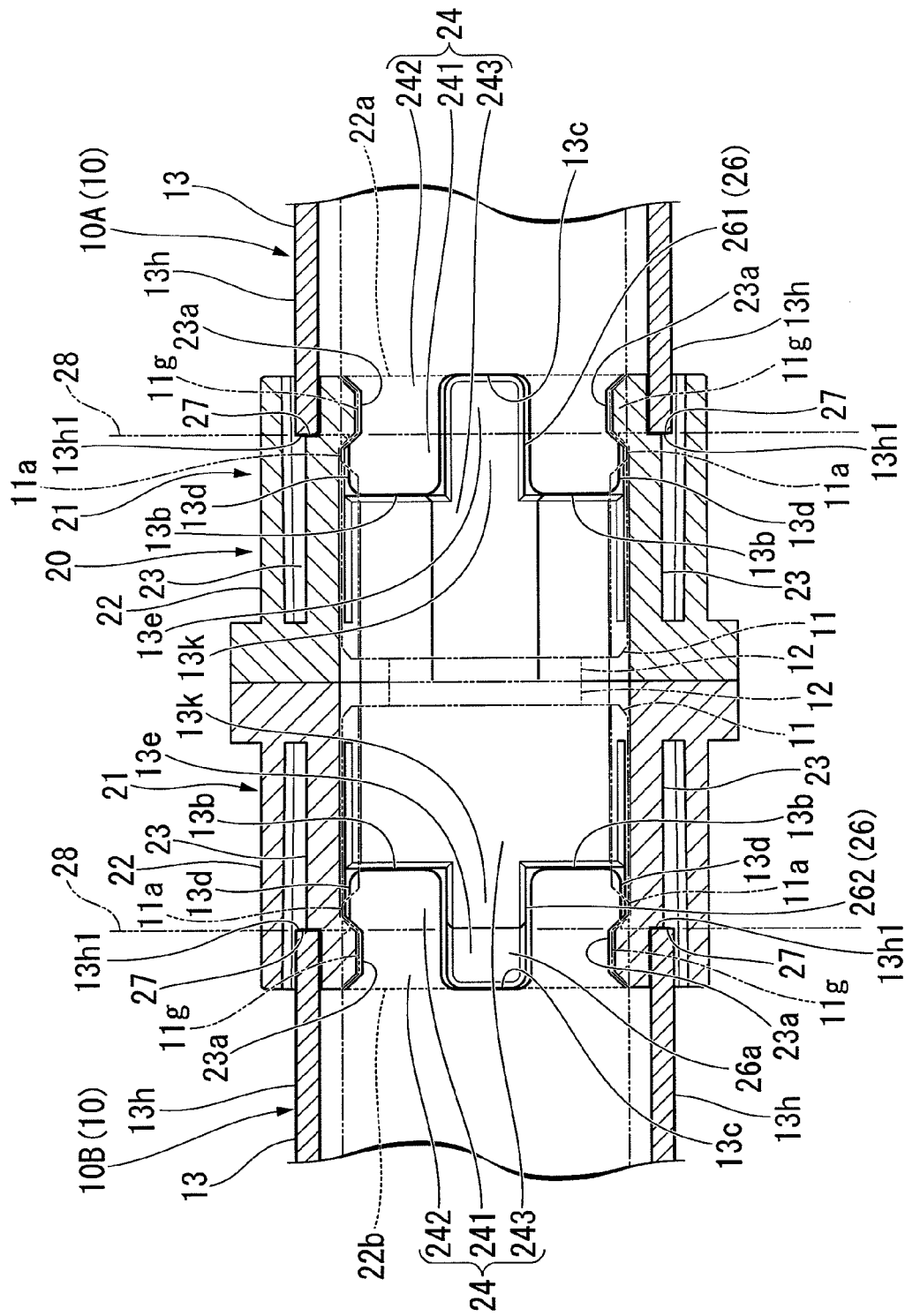
FIG. 10 is a horizontal sectional view illustrating a state in which the optical connectors shown in FIG. 1 are connected (coupled) to each other using the connector adapter shown in FIG. 3.

As shown in FIGS. 9 and 10, the optical connector 10 is inserted into the connector fitting hole 24 of the adapter half body 21 from the front end thereof.

When the optical connector 10 is inserted into the connector fitting hole 24 of the adapter half body 21, the protruding claws 23a of the pair of elastic engagement pieces 23 in the adapter half body 21 are placed on engagement protrusions 11a protruding from the front ends of the both side wall portions 11e in the front end portion of the housing 11.

The protruding claws 23a are formed at the ends of the elastic engagement pieces 23 in a shape protruding toward the opposite elastic engagement pieces 23 facing each other.

The elastic engagement pieces 23 are elastically deformed when the protruding claws 23a are placed on the engagement protrusions 11a of the housing 11.

When the optical connector 10 is further inserted into the adapter half body 21 (when the housing 11 is further inserted into the connector fitting hole 24), the front ends (the reference end face 13a) of the side plate portions 13h of the coupling 13 butt the protruding claws 23a at the ends of the elastic engagement pieces 23 placed on the engagement protrusions 11a.

With the further insertion of the optical connector 10 into the adapter half body 21, the coupling 13 slides back to the connector rear side relative to the housing 11.

With the further insertion of the optical connector 10 into the adapter half body 21, the end portions (the protruding claws 23a) of the elastic engagement pieces 23 go over the engagement protrusions 11a and go into the connector rear side (an engaging recessed portion 11g) of the engagement protrusions 11a, whereby the butting state with the front ends (the reference end face 13a) of the side plate portions 13h of the coupling 13 is released.

In the optical connector 10, when the butting of the end portions (the protruding claws 23a) of the elastic engagement pieces 23 with the front end (the reference end face 13a) of the side plate portions 13h of the coupling 13 is released, the coupling 13 moves to the front movement limit position by means of the elastic impelling force of the coupling spring.

In the optical connector 10, the end portions of the pair of elastic engagement pieces 23 of the adapter half body 21 are received inside the coupling 13 (specifically in the inner surface of the side plate portions 13h) (the state shown in FIG. 10).

In this way, the optical connector 10 is completely coupled to the adapter half body 21 and the adapter 20.

At this time, the front ends (the reference end face 13a) of the side plate portions 13h of the coupling of the optical connector 10 come in contact with the coupling 13 contact face 27 of the adapter half body 21.

The coupling 13 receiving the end portions of the elastic engagement pieces 23 of the adapter half body 21 regulating the rising-up of the end portions of the elastic engagement pieces 23 from the outer circumferential surface of the housing 11 and holds the engagement of the elastic engagement pieces 23 with the engagement protrusions 11a.

As shown in FIGS. 3, 4, and 10, the coupling 13 of the optical connector 10 is inserted into the connector fitting hole 24 from the entrance hole portion 242 opened in the opening end portion of the adapter half body 21.

When the optical connector 10 is inserted into and coupled to the adapter half body 21, the coupling 13 is inserted into the connector fitting hole 24 until the front ends of the side plate portions 13h at both ends in the width direction thereof come in contact with the coupling contact face 27 of the adapter half body 21.

Among the part of the coupling 13 inserted into the connector fitting hole 24, the part in the back of the coupling reference plane 13i (see FIG. 5) is received in the entrance hole portion 242.

As shown in FIGS. 6 to 10, the optical connector 10 is coupled to the adapter half body 21 by inserting the housing 11 into the connector fitting hole 24 of the adapter half body 21, inserting the protrusions 13d of the coupling 13 into the adapter recesses 25 of the adapter half body 21, and receiving the adapter protrusions 26 of the adapter half body 21 in the cutouts 13e of the coupling 13.

Since the protruding claws 23a of the pair of elastic engagement pieces 23 are located in the entrance hole portion 242, the protruding claws 23a at the ends of the elastic engagement pieces 23 engage with both engagement protrusions 11a of the housing 11 of the optical connector 10 in the entrance hole portion 242.

By inserting the coupling 13 of the optical connector 10 into the connector fitting hole 24 until the front ends of the side plate portions 13h come in contact with the coupling contact face 27 of the adapter half body 21, the coupling receives the end portions of the elastic engagement pieces 23 engaging with both engagement protrusions 11a of the housing 11.

As shown in FIGS. 1A, 1B and 2 to 4, the front ends of a pair of face plate portions 13f and 13g (the upper plate portion 13f and the lower plate portion 13g) of the coupling 13 of the optical connector 10 have the configuration in which the cutout 13e is formed between two protrusions 13d.

Two protrusions 13d of the upper plate portion 13f are disposed on both sides of the key 11b of the housing 11.

The entire part including the cutout 13e between the pair of protrusions 13d constitutes an adapter-protrusion receiving recessed portion 13k receiving the adapter protrusion 26 of the adapter half body 21.

The adapter-protrusion receiving recessed portion 13k is formed just above the key 11b of the housing 11 of the optical connector 10.

The two protrusions 13d and the cutout 13e of the lower plate portion 13g are formed at positions corresponding to the two protrusions 13d and the cutout 13e of the upper plate portion 13f in the thickness direction (the up and down direction) of the optical connector 10.

The shapes and sizes of the front end faces of the upper plate portion 13f and the lower plate portion 13g of the coupling 13 of the optical connector 10 shown in the drawings can be set to be the same.

As shown in FIGS. 6 to 10, four adapter recesses 25 in total are formed in the half-body housing 22 of the adapter half body 21 so as to receive four protrusions 13d in total protruding two by two from the front ends of the pair of face plate portions 13f and 13g of the coupling 13 of the optical connector 10.

The adapter recesses 25 are formed two by two in a wall portion 22a (hereinafter, also referred to as a key-groove side wall portion) on the side in which the key groove 24b is formed and a wall portion 22b opposite thereto (hereinafter, also referred to as a bottom side wall portion), with the fitting-hole main hole portion 24a having a flat section of the connector fitting hole 25 interposed therebetween, in the half-body housing 22.

The half-body housing 22 of the adapter half body 21 shown in the drawings has a rectangular tubular shape of which the length direction of the section is parallel to the length direction of the section of the fitting-hole main hole portion 24a.

Among a pair of wall portions extending in the length direction of the section of the half-body housing 22, the wall portion having the key groove 24b formed therein is the key-groove side wall portion 22a and the other wall portion is the bottom side wall portion 22b.

As shown in FIGS. 6 to 10, the adapter protrusions 26 of the half-body housing 22 are defined between a pair of adapter recesses 25 of the key-groove side wall portion 22a and between a pair of adapter recesses 25 of the bottom side wall portion 22b in the half-body housing 22.

The adapter protrusion 26 (referenced by reference numeral 261 in the drawing) of the key-groove side wall portion 22a and the adapter protrusion 26 (referenced by reference numeral 262 in the drawing) of the bottom side wall portion 22b have a protruding claw shape extending in the axis line direction of the connector fitting hole 24.

The adapter protrusion 261 of the key-groove side wall portion 22a corresponds to the key groove 24b in the position in the length direction of the section (the spacing direction between both wall portions 22a and 22b with the connector fitting hole 24 interposed therebetween) of the connector fitting hole 24 having a flat section.

The adapter protrusion 261 extends in the axis line direction of the connector fitting hole 24 from the key groove 24b to the half-body opening end portion.

The face (the protruding end face) of the adapter protrusion 261 facing the bottom side wall portion 22b is formed to be flush with the groove bottom of the key groove 24b.

As shown in FIGS. 7 and 8, in the adapter half body 21, a virtual plane of which the position in the axis line direction of the connector fitting hole 24 corresponds to the coupling contact face 27 and which is perpendicular to the center axis line of the connector fitting hole 24 is hereinafter referred to as an adapter reference plane.

The adapter reference plane is referenced by reference numeral 28.

The adapter recess 25 of the adapter half body 21 shown in the drawing is formed in a groove shape extending (being depressed) from the opening of the connector fitting hole 24 over the adapter reference plane 28 to the half-body base end portion (the base end portion of the half-body housing 22).

The adapter protrusion 26 is a protrusion extending (protruding) from the adapter reference plane 28 to the half-body opening end portion (the fitting-hole opening end portion).

As shown in FIGS. 9 and 10, the optical connector 10 is inserted and coupled to the adapter half body 21 by receiving the adapter protrusions 26 of the adapter half body 21 in the adapter-protrusion receiving recessed portions 13k on the top side (the upper plate portion 13f) and the bottom side (the lower plate portion 13g) of the coupling 13 and inserting the protrusions 13f into the adapter recesses 25 of the half-body housing 22.

The optical connector 10 having been completely inserted into and coupled to the adapter half body 21 can be detached from the adapter half body 21 by putting the coupling 13 to the connector rear side.

The elastic engagement pieces 23 of the adapter half body 21 engaging with the engagement protrusions 11a of the housing 11 of the optical connector 10 is forcibly disengaged from the engagement protrusions 11a by means of the detaching force for moving the coupling 13 to the connector rear side, by moving the coupling 13 to the connector rear side to detach the elastic engagement pieces from the coupling 13.

The optical connector 10 can be attached to and detached from the adapter half body 21 in a push-pull manner.

As shown in FIGS. 3 and 4, the optical connector 10 can be inserted into and coupled to the connector fitting hole 24 only in the direction in which the key 11b of the housing 11 can be inserted into the key groove 24b of the connector fitting hole 24 of the adapter half body 21.

Here, as shown in FIGS. 7 to 9, a pair of adapter half bodies 21 constituting the adapter 20 are formed in a body in the direction in which the key grooves 24b of the connector fitting holes 24 are located on the opposite sides with the center axis line of the connector insertion hole 21a interposed therebetween.

Accordingly, as shown in FIGS. 5 and 9, the insertion directions of a pair of optical connectors 10, which is inserted into the adapter 20 from both sides and connected to each other, into the adapter 20 are reversed.

As shown in FIGS. 3 and 4, an end cutout 26a used to distinguish the key-groove side wall portion 22a from the adapter protrusion 26 is formed at an end of the adapter protrusion 26 of the bottom side wall portion 22b in the extending direction to the opening end portion of the connector fitting hole 24 among two adapter protrusions 26 of the adapter half body 21.

The end cutout 26a is not formed in the adapter protrusion 26 of the key-groove side wall portion 22a but is formed only in the adapter protrusion 26 of the bottom side wall portion 22b.

Accordingly, the optical connector 10 can be coupled to the adapter half body 21 by inserting the optical connector into the connector fitting hole 24 from the opening end portion of the half-body housing 22 in the direction in which the lower wall portion 11d of the housing 11 butts the bottom side wall portion 22b of the half-body housing 22.

The end cutout 26a serves as direction distinguishing means that can allow the visual distinction between the side having the key groove 24b and the side not having the key groove 24b in the short side direction of the section of the connector fitting hole 24 having a flat section inside the adapter half body 21, from the outside of the adapter half body 21.

The direction distinguishing means is not limited to the formation of the end cutout 26a, but the coloring of the adapter protrusion or the like may be employed.

The direction distinguishing means is not limited to the configuration in which it is provided to the adapter protrusion, but may be provided to a position other than the adapter protrusion of the opening end portion of the adapter half body 21.

The end cutout 26a may be formed only in the adapter protrusion 26 of the key-groove side wall portion 22a.

Figure 11:
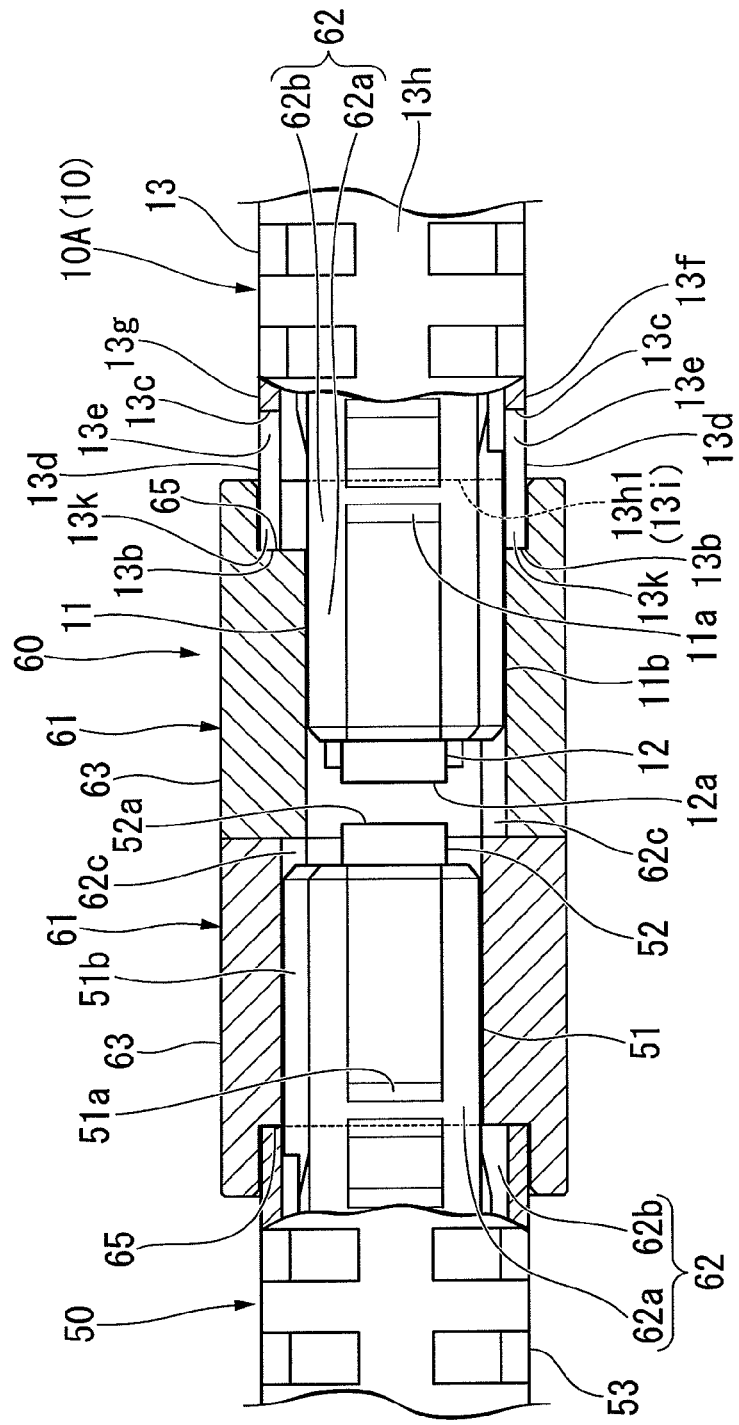
FIG. 11 is a front sectional view illustrating prevention of erroneous coupling of the optical connector shown in FIGS. 1A and 1B to a standardized connector adapter (standard connector adapter).

As shown in FIG. 11, when the optical connector 10 is inserted into a connector adapter 60 used to connect the standard optical connectors 50, it cannot be coupled to the connector adapter 60.

Here, the standard optical connector 50 and the connector adapter 60 for connection thereof will be described below.

The connector adapter 60 is a standardized connector adapter based on the JIS standard (JIS C5982) or the IEC standard (IEC 61754-7).

Hereinafter, this connector adapter is also referred to as a standard adapter.

Figure 20:
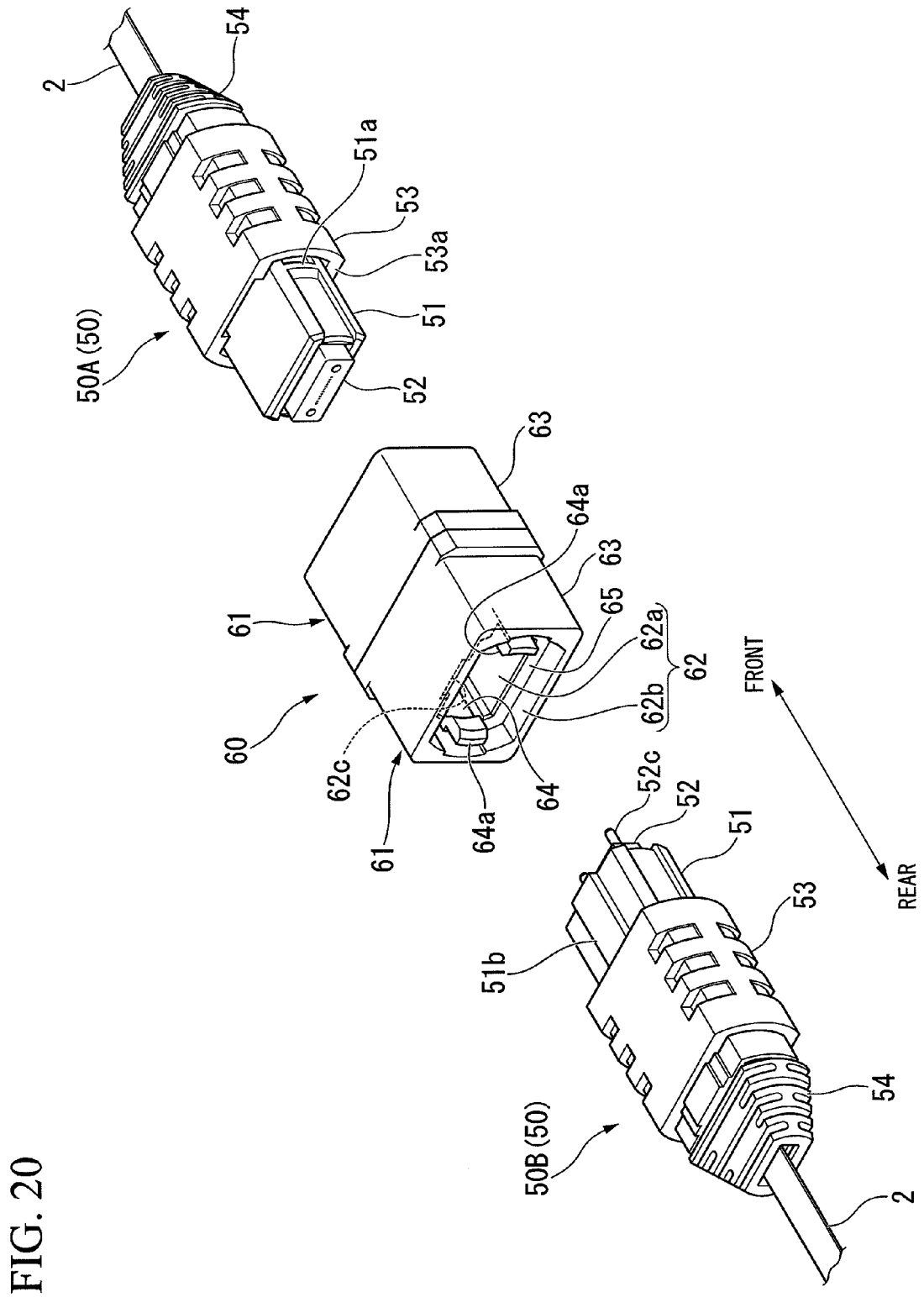
FIG. 20 is a perspective view illustrating the standard optical connector shown in FIGS. 12 and 13 and a standardized connector adapter (standard connector adapter) to which the standard optical connector can be inserted and coupled (fitted).

The standard optical connector 50 shown in FIG. 20 is an MPO type optical connector having a configuration based on the JIS C5982 or the IEC 61754-7.

The optical connector 50 is assembled to an end of an optical fiber 2 which is an optical fiber tape.

The optical connector 50 includes a ferrule 52 attached to the end of the optical fiber 2, a sleeve-like housing 51 that receives the ferrule 52 in the end (the front end) thereof, and a spring 55 (see FIG. 21) that elastically impels the ferrule 52 received in the housing 51 to the connector front side.

The optical connector 50 further includes a tubular coupling 53 into which the housing 51 is inserted and which disposed to be slidable within a movable range guaranteed in the axis line direction of the housing 51 and a boot 54 attached to the rear end of the housing 51 opposite to the front end at which the ferrule 52 is disposed.

The standard optical connector 50 shown in the drawing is different from the optical connector 10, only in the coupling 53.

The configuration of the standard optical connector 50 other than the coupling 53 is the same as the optical connector 10.

The elements of the standard optical connector 50 other than the coupling 53 are those as the optical connector 10.

As described above, the front end face 53a (the reference face) of the coupling 53 is a flat surface perpendicular to the center axis line of the coupling 53.

Figure 21:
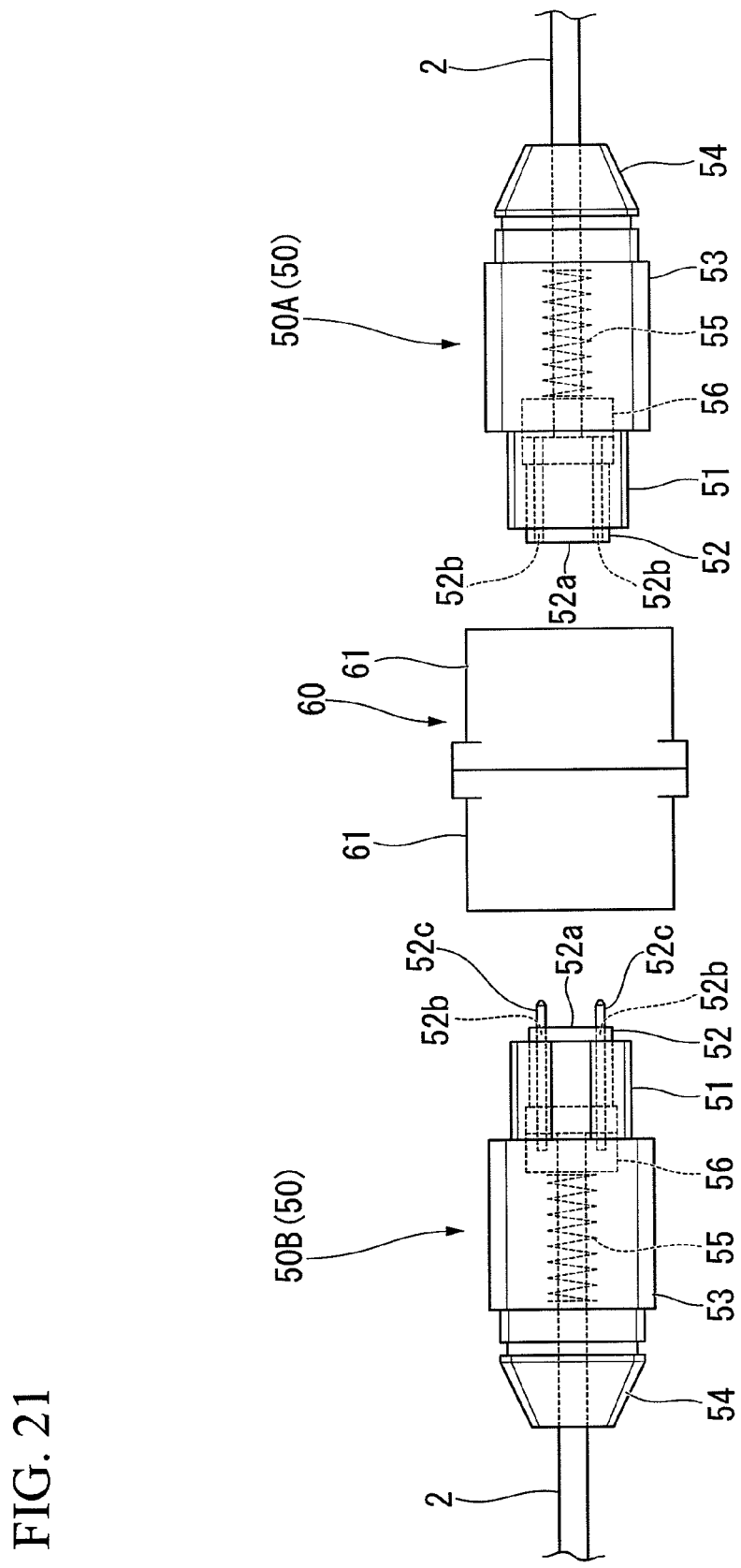
FIG. 21 is a plan view illustrating the standard optical connector and the standard connector adapter shown in FIG. 20.

As shown in FIG. 21, an F type standard optical connector 50A in which a pair of guide pin holes 52b are formed in the end face 52a of the ferrule 52 and an M type optical connector 50B in which guide pins 52c to be inserted and fitted into the pair of guide pin holes 52b protrude from the end of the ferrule 52 are used for the connection between the standard optical connectors 50 using the standard adapter 60.

In the connection between the standard optical connectors 50, the F type standard optical connector 50A is inserted into and coupled to a tubular standard adapter 60 from one end in the axis line direction thereof, the M type standard optical connector 50A is inserted into and coupled to the standard adapter 60 from the other end in the axis line direction, and the ferrules 52 at the ends of the standard optical connectors 50 are butt-jointed.

Figure 23:
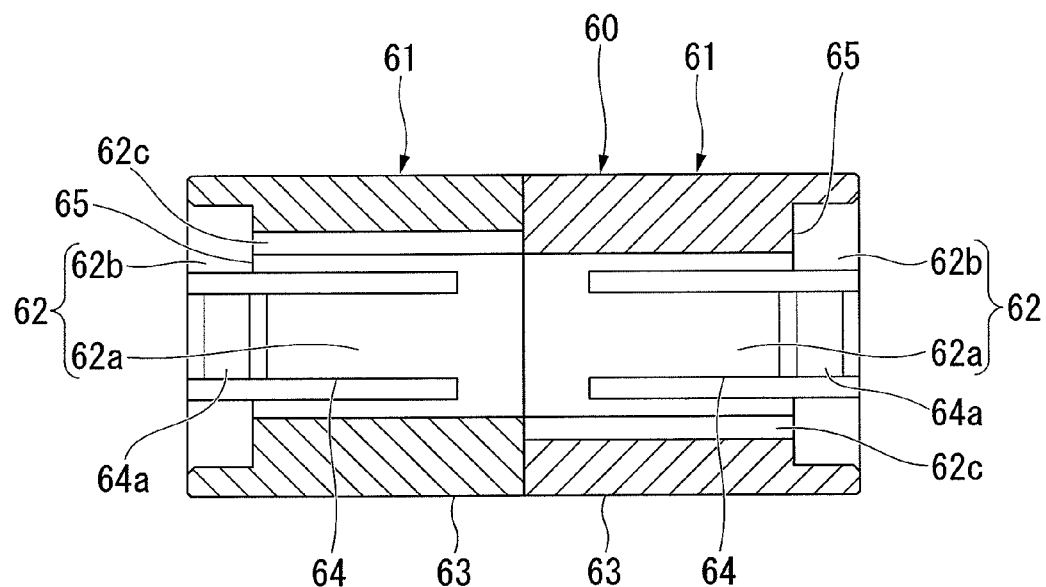
FIG. 23 is a front sectional view illustrating the internal structure of the standard connector adapter shown in FIGS. 11 and 20.
Figure 24:
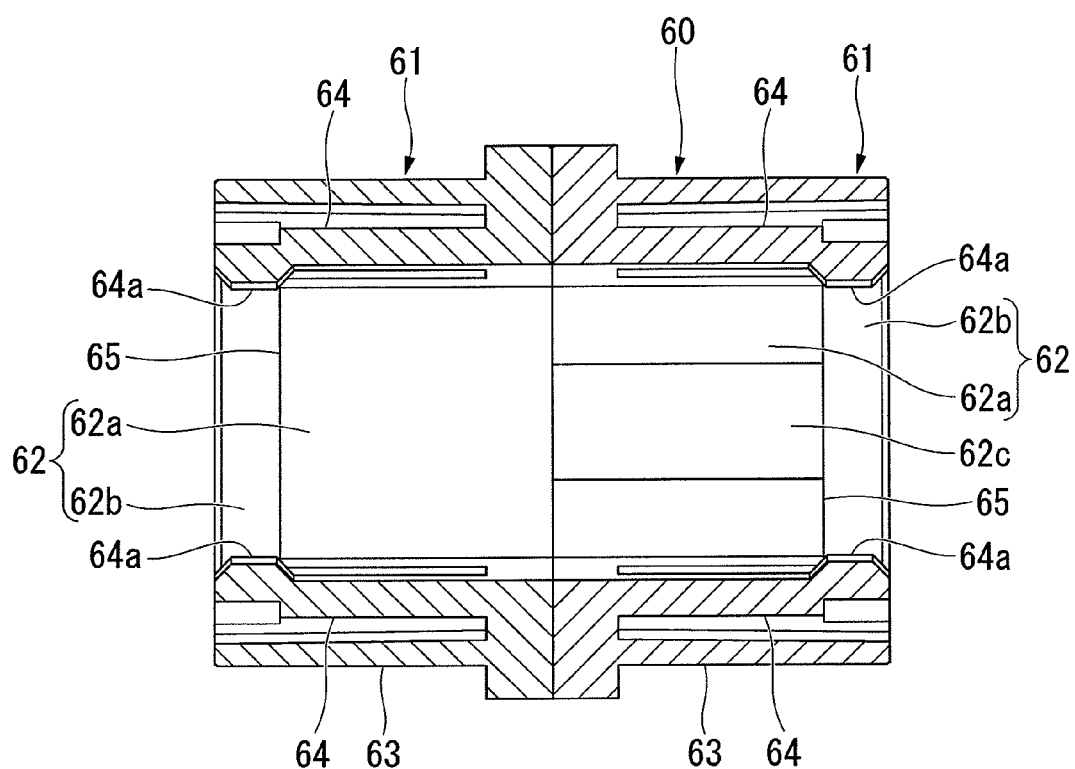
FIG. 24 is a horizontal sectional view illustrating the internal structure of the standard connector adapter shown in FIGS. 11 and 20.

As shown in FIGS. 20, 23, and 24, the standard adapter 60 has a configuration in which a pair of standard adapter half bodies 61 having the same configuration is formed in a body.

Each standard adapter half body 61 has a configuration in which a pair of elstic engagement claws 64 detachably engaging with both engagement protrusions 51a of the housing 51 of the standard optical connector 50 protrudes in a tubular body 63 having a connector hole 62 formed therethrough, into which the standard optical connector 50 is inserted.

The elastic engagement claw 64 is an elastic piece extending in the connector hole 62 from one end in the axis line direction of the tubular body 63 to the other end in the axis line direction of the tubular body 63.

The elastic engagement claw 64 detachably engages with the housing 51 by causing protrusions 64a protruding from the ends thereof to engage with both engagement protrusions 51a of the housing 51 of the standard optical connector 50.

The connector hole 62 of the standard adapter half body 61 has a configuration in which an enlarged opening portion 62b obtained by enlarging the housing receiving hole 62a is formed at one end in the axis line direction of the housing receiving hole 62a receiving and positioning the housing 51 of the standard optical connector 50.

The housing receiving hole 62a includes a key groove 62c into which a key 51b protruding from the housing 51 of the standard optical connector 50 is inserted.

The enlarged opening portion 62b is formed in a size (sectional size) sufficient to receive the coupling 53 of the standard optical connector 50.

The insertion and coupling of the standard optical connector 50 to the standard adapter half body 61 can be achieved by thrusting the standard optical connector 50 into the connector hole 62 from the enlarged opening portion 62b at one end in the axis line direction of the connector hole 62.

The thrust of the standard optical connector 50 into the connector hole 62 is performed by causing an operator to press a part of the optical connector 50 located in the back of the coupling 53, for example, the boot 54 with his or her finger toward the adapter half body 61.

As shown in FIG. 22, the standard optical connector 50 is coupled (fitted) to the standard adapter half body 61 by inserting the housing 51 into the housing receiving hole 62a of the connector hole 62 and receiving the end portion of the elastic engagement claws 64 engaging with the housing 51 from both sides in the front end portion of the coupling 53 inserted into the enlarged opening portion 62b of the connector hole 62.

By receiving the end portions of the elastic engagement claws 64 engaging with both engagement protrusions 51a of the housing 51, the coupling 53 restricts the disengagement due to the rising-up of the ends of the elastic engagement claws 64 from the housing 51 and maintains the engaged state of the elastic engagement claws 64 with the housing 51.

The coupling 53 of the standard optical connector 50 is inserted into the enlarged opening portion 62b of the connector hole 62 and the front end face 53a thereof comes in contact with a coupling contact face 65 (an adapter reference face) which is a stepped face located in the boundary between the enlarged opening portion 62b of the connector hole 62 and the housing receiving hole 62a on the deeper side.

In the connector hole 62, the coupling contact face 65 is formed along the outer circumference of the deep end of the enlarged opening portion 62b.

The protrusions 64a at the ends of the pair of elastic engagement claws 64 of the standard adapter half body 61 are positioned in the enlarged opening portion 62b.

Accordingly, the protrusions 64a at the ends of the elastic engagement claws 64 engage with both engagement protrusions 51a of the housing 51 of the standard optical connector 50 in the enlarged opening portion 62b.

The coupling 53 of the standard optical connector 50 is inserted into the enlarged opening portion 62b until the front end face 53a thereof comes in contact with the coupling contact face 65 of the standard adapter half body 61, whereby the ends of the elastic engagement claws 64 engaging with both engagement protrusions 51a of the housing 51 is received in the coupling.

As shown in FIG. 11, when the optical connector 10 is inserted into the connector hole 62 of the standard adapter half body 61 of the standard adapter 60, the ends of the protrusions 13d at the front end of the coupling 13 comes in contact with the coupling contact face 65 at the deep end of the enlarged opening portion 62b of the standard adapter half body 61.

Accordingly, the front end faces 13h1 of the side plate portions 13h of the coupling 13 of the optical connector 10 do not come in contact with the coupling contact face 65.

As shown in FIG. 11, since the ends of the protrusions 13d of the coupling 13 of the optical connector 10 come in contact with the coupling contact face 65 of the standard adapter half body 61, the side plate portions 13h of the coupling 13 are located at the positions not coming in contact with the pair of elastic engagement claws 64 of the standard adapter half body 61.

In the optical connector 10 shown in the drawing, since the ends of the protrusions 13d come in contact with the coupling contact face 65, the side plate portions 13h of the coupling 13 are not inserted into the enlarged opening portion 62b of the standard adapter half body 61 and is located at the positions separated outward from the tubular body 63 of the standard adapter half body 61.

Accordingly, since the ends of the protrusions 13d in the optical connector 10 come in contact with the coupling contact face 65, the end portions of the pair of elastic engagement claws 64 of the standard adapter half body 61 are not received inside the coupling 13 (in the inner surfaces of the side plate portions 13h).

Accordingly, the optical connector 10 is not coupled to the standard adapter half body 61.

The optical connector 10 can satisfactorily prevent from being erroneously coupled to the standard adapter half body 61 of the standard adapter 60.

As shown in FIG. 11, since the ends of the protrusions 13d in the optical connector 10 come in contact with the coupling contact face 65, the ferrule 12 at the front end thereof can be located at a position separated from the ferrule 52 of the standard optical connector 50 inserted into and coupled to the standard adapter 60 from the side opposite to the optical connector 10.

As shown in FIGS. 1A, 1B, and 10, and the like, Each engagement protrusion 11a of the housing 11 of the optical connector 10 has a mountain shape in which slopes formed on both sides of an apex portion, which extends in the thickness direction of the housing 11, in the connector inserting direction come closer to the apex portion.

On the other hand, as shown in FIG. 24 and the like, the protrusion 64a at the end of each elastic engagement claw 64 of the standard adapter 61 has a mountain shape in which slopes formed on both sides of an apex portion (apex face) thereof in the length direction of the elastic engagement claws 64 come closer to the apex portion.

When the standard optical connector 50 is inserted into the connector hole 62 of the standard adapter half body 61, the protrusions 64a at the ends of the elastic engagement claws 64 are smoothly engaged with and disengaged from the engagement protrusions 51a of the housing 51 by means of the displacement of the housing 51 of the standard optical connector 50 in the axis line direction of the connector hole 62.

The force necessary for disengaging the protrusions 64a at the ends of the elastic engagement claws 64, which engage with the engagement protrusions 51a of the housing 51 on the rear side, from the engagement protrusions 51a, is small.

The protrusions 23a at the ends of the elastic engagement pieces 23 of the adapter 20 has the same shape as the protrusions 64a at the ends of the elastic engagement claws 64 of the standard adapter 60.

As described above, regarding the coupling 13 of the optical connector 10, the movable range in which the coupling can move in the axis line direction relative to the housing 11, in other words, the range in which the coupling can slide back from the front movement limit position, is guaranteed.

Accordingly, even in the state (FIG. 11) where the ends of the protrusions 13d of the coupling 13 of the optical connector 10 come in contact with the coupling contact face 65, the housing 11 can be thrust into the connector hole 62 of the standard adapter half body 61 against the elastic impelling force of the coupling spring.

In the optical connector 10, by thrusting the housing 11a into the connector hole 62 of the standard adapter half body 61, the protrusions 64a at the ends of the elastic engagement claws 64 can engage with the engagement protrusions 11a of the housing 11.

This engagement can be caused when the protruding height of the protrusions 13d of the coupling 13 from the coupling reference plane to the connector front side is smaller than the movable range of the coupling 13 in the axis line direction relative to the housing 11.

However, the force necessary for disengaging the protrusions 64a at the ends of the elastic engagement claws 64 having engaged with the engagement protrusions 11a of the housing 11 is small.

The engagement between the engagement protrusions 11a of the housing 11 and the protrusions 64a at the ends of the elastic engagement claws 64 in the state where the ends of the protrusions 13d of the coupling 13 come in contact with the coupling contact face 65 is smoothly released by means of the elastic impelling force of the coupling spring.

In the optical connector 10 shown in the drawing, in the state where the ends of the protrusions 13d of the coupling 13 come in contact with the coupling contact face 65 (FIG. 11) and the coupling 13 is located at the front movement limit position relative to the housing 11, the ferrule 12 is located at a position separated from the ferrule 52 of the standard optical connector 50.

Accordingly, the optical connector 10 can satisfactorily prevent the erroneous connection to the standard optical connector 50 in the standard adapter 60.

When an operator inserts the optical connector 10 into the standard adapter half body 61 with his or her finger, the part of the coupling 13 in the back of the coupling reference plane cannot be inserted into the connector hole 62 (specifically, the enlarged opening portion 62b), whereby the operator can simply recognize the erroneous insertion.

Since the protruding portions 13b and the recessed portions 13c are formed in the coupling 13, the optical connector 10 can be simply visually distinguished from the standard optical connector 50.

The optical connector 10 can employ standardized elements based on the standard as constituent elements, except for the coupling 13.

The optical connector 10 can be simply assembled by only using the coupling 13 having the protruding portions 13b and the recessed portions 13c instead of the coupling of the standardized optical connector 50.

Since the plastic coupling 13 having the protruding portions 13b and the recessed portions 13c has a simple structure and can be easily molded with resin, it is possible to manufacture the plastic coupling 13 at a low cost.

The erroneous connection between the optical connector 10 and the standard optical connector 50 can be simply prevented at a low cost, by only using the coupling 13 having the protruding portions 13b and the recessed portions 13c.

Figure 12:
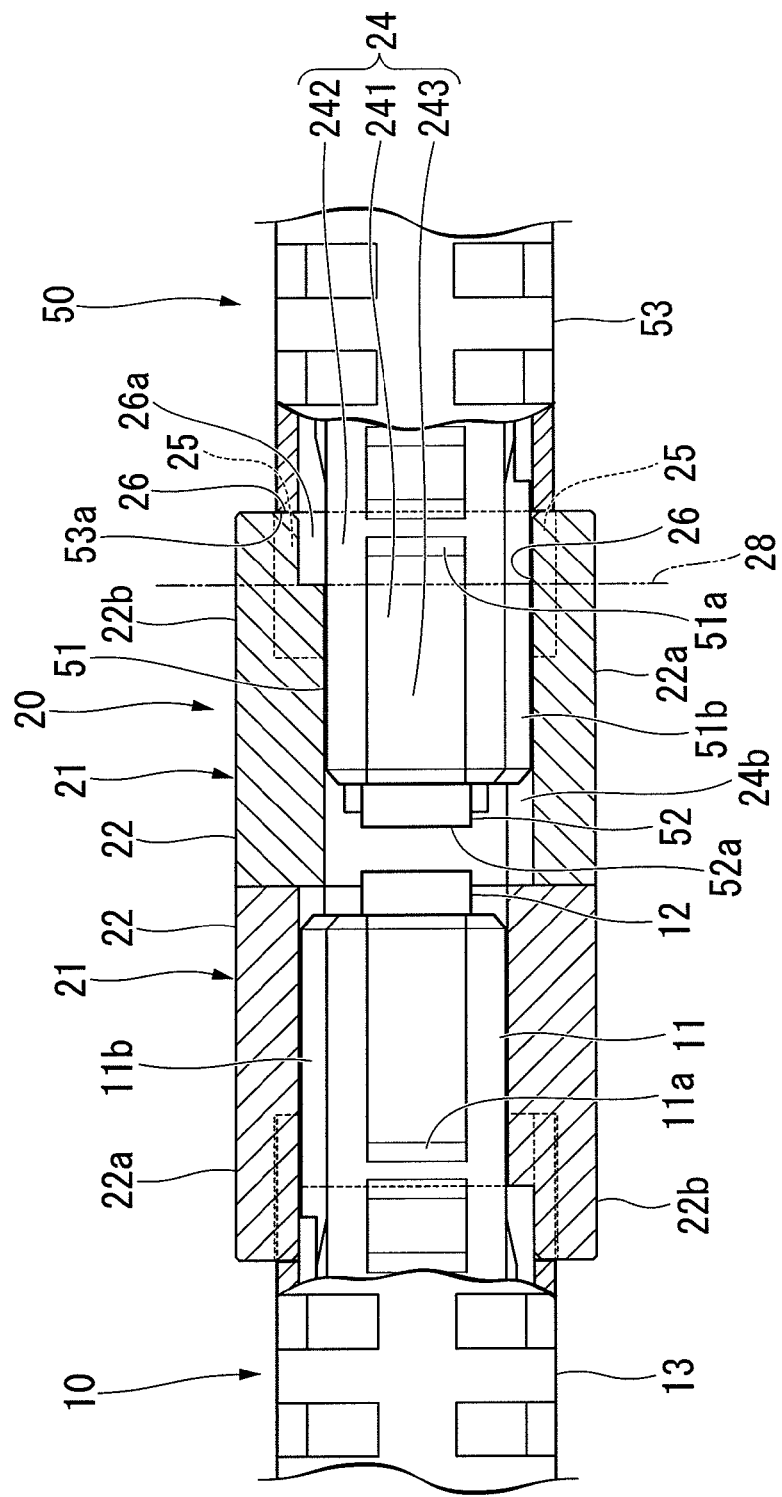
FIG. 12 is a front sectional view illustrating prevention of erroneous coupling of a standardized optical connector (MPO type optical connector, standard optical connector) to the connector adapter shown in FIG. 3.
Figure 13:
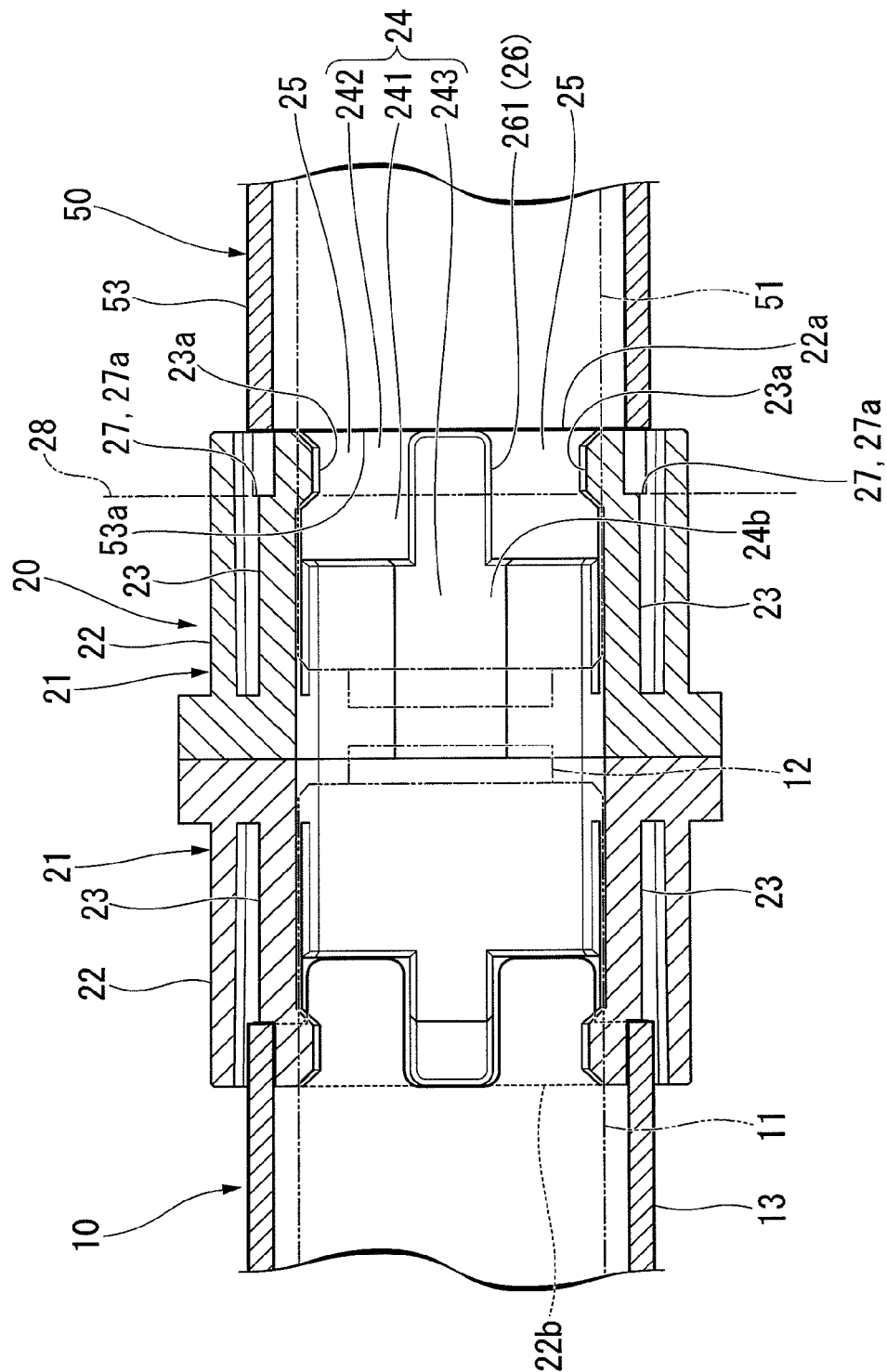
FIG. 13 is a horizontal sectional view illustrating prevention of erroneous coupling of a standardized optical connector (MPO type optical connector, standard optical connector) to the connector adapter shown in FIG. 3.

As shown in FIGS. 12 and 13, the standard optical connector 50 cannot be coupled to the adapter half body 21, even when it is inserted into the connector fitting hole 24 of the adapter half body 21 of the adapter 20 for connecting the optical connectors 10.

When the standard optical connector 50 is inserted into the connector fitting hole 24 of the adapter half body 21 from the front end thereof, the front end face 53a of the coupling 53 comes in contact with the adapter protrusions 26 inside the opening end portion of the half-body housing 22 of the adapter half body 21.

Accordingly, the coupling 53 of the standard optical connector 50 cannot be inserted into the entrance hole portion 242 inside the opening end portion of the half-body housing 22 and the end portions of the elastic engagement pieces 23 of the adapter half body 21 cannot be received in the coupling 53.

Accordingly, the adapter 20 can satisfactorily prevent the erroneous coupling to the standard optical connector 50.

When the force for the thrust into the adapter 20 is not given to the housing 51 of the standard optical connector 50 inserted into the adapter half body 21, the adapter 20 shown in the drawing can locate the ferrule 52 of the standard optical connector 50 at the position separated from the ferrule 12 of the optical connector 10 inserted and fitted (coupled) to the adapter 20 from the side opposite to the standard optical connector 50.

As a result, the adapter 20 can prevent the erroneous connection between the optical connector 10 and the standard optical connector 50 in the adapter 20.

As described above, the optical connector 10 can satisfactorily prevent the erroneous coupling to the connector adapter (the standard adapter 60) for the standard optical connector 50 and the adapter 20 can satisfactorily prevent the erroneous coupling to the standard optical connector 50.

Accordingly, even when the optical connector 10 and the adapter 20 are used to connector-connect the optical fibers in a spot where an optical fiber in which the standard optical connector 50 is assembled to the end thereof and the standard adapter 60 exist, it is possible to easily use the optical connector 10 and the standard optical connector 50 as distinct from each other.

The number of protruding portions and the number of recessed portions disposed in the coupling of the optical connector are not limited to the number of protruding portions 13b and the number of recessed portions 13c in the coupling 13 of the optical connector 10 shown in FIGS. 1A and 1B.

The coupling of the optical connector may have one or more protruding portions protruding and one or more recessed portions depressed relative to the coupling reference plane.

The connector adapter to which an optical connector including a coupling having the protruding portions and the recessed portions formed therein can be inserted and coupled needs to have one or plural (one or more) adapter recesses formed to receive all the protruding portions of the coupling and one or more adapter protrusions formed to be able to be received in the recessed portions of the coupling.

Here, the adapter recess is a recessed portion depressed toward the deep side of the adapter relative to the adapter reference plane which is superimposed on the coupling reference plane of the optical connector coupled (fitted) to the adapter, and the adapter protrusion is a protruding portion protruding in the opposite side of the deep side of the adapter from the adapter reference plane.

FIGS. 14A, 14B, 15A and 15B show examples of a combination of the protruding portions and the recessed portions formed in the coupling of the optical connector and the adapter recesses and the adapter protrusions formed in the adapter to which the optical connector can be inserted and coupled.

The elements common to FIGS. 14A, 14B, 15A and 15B are referenced by common reference numerals.

Figure 14A:
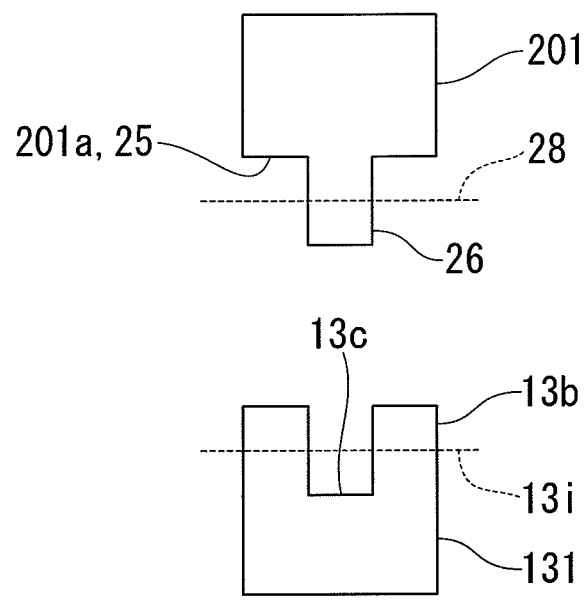
FIGS. 14A and 14B are model diagrams illustrating an example of the relation between the protruding portion and the recessed portion of a coupling of the optical connector and the adapter recess and the adapter protrusion of the connector adapter, where
Figure 14B:
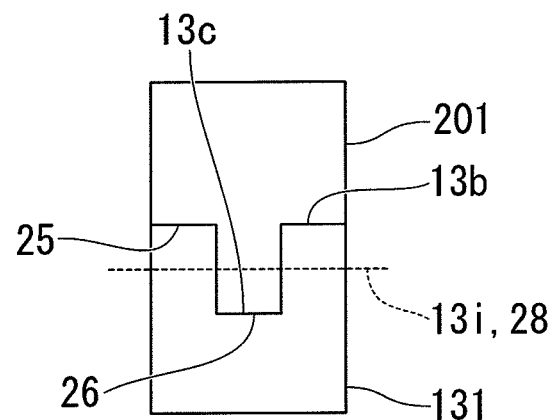

A coupling 131 shown in FIGS. 14A and 14B include a recessed portion 13c depressed from the coupling reference plane 13i and protruding portions 13b formed on both sides of the recessed portion 13c.

The protruding portions 13b protrude from the coupling reference plane 13i.

An adapter 201 has an adapter protrusion 26 formed therein.

An end face 201a of the adapter 201 is located in the back of the adapter reference plane 28 (on the opposite side of the end of the adapter protrusion 26 about the adapter reference plane 28.

In the adapter 201, the entire region located in the back of the adapter reference plane 28 serves as the adapter recess 25.

In the example shown in FIGS. 14A and 14B, the coupling 131 can receive the adapter protrusion 26 of the adapter 201 between the protruding portions 13b on the both sides of the recessed portion 13c.

By causing the coupling 131 to receive the adapter recess 26 between the protruding portions 13b on both sides of the recessed portion 13c, the coupling reference plane 13i can be flush with the adapter reference plane 28.

When the coupling 131 receives the adapter protrusion 26 between the protruding portions 13b on both sides of the recessed portion 13c so that the coupling reference plane 13i is flush with the adapter reference plane 28, the protruding portions 13b are inserted into the end face 201a of the adapter 201 from the adapter reference plane 28.

The coupling 131 shown in FIGS. 14A and 14B include the protruding portions 13b

Accordingly, even when the optical connector including the coupling 131 is inserted into the standard adapter 60, it cannot be coupled to the standard adapter 60, thereby preventing the erroneous connection to the standard optical connector 50 in the standard adapter 60.

The adapter 201 shown in FIGS. 14A and 14B include the adapter protrusion 26.

Accordingly, when the standard optical connector 50 is inserted into the adapter, the adapter cannot be coupled to the standard optical connector 50, thereby preventing the erroneous connection between the optical connector including the coupling 131 and the standard optical connector 50.

Figure 15A:
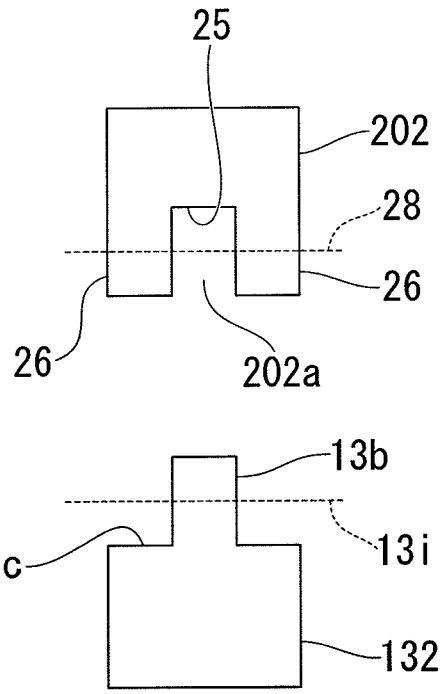
FIGS. 15A and 15B are model diagrams illustrating another example of the relation between the protruding portion and the recessed portion of a coupling of the optical connector and the adapter recess and the adapter protrusion of the connector adapter, where
Figure 15B:
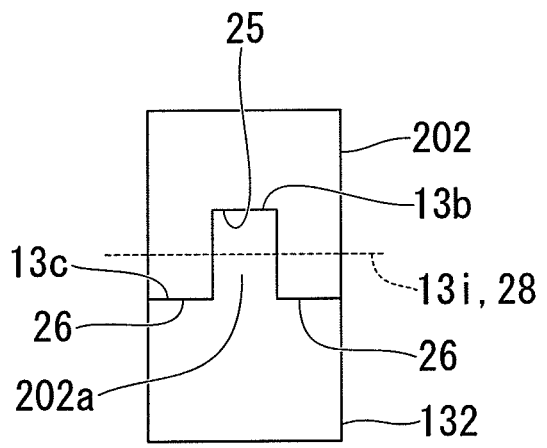

As shown in FIGS. 15A and 15B, a coupling 132 includes a protruding portion 13b.

An end face 132a of the coupling 132 other than the protruding portion 13b is located in the back of the coupling reference plane 13i (on the opposite side of the end of the protruding portion 13b about the coupling reference plane 13i).

In the front end face (connecting end face) of the coupling 132, the entire part located in the back of the coupling reference plane 13i serves as the recessed portion 13c.

An adapter 202 includes an adapter recess 25 depressed from the adapter reference plane 28 and adapter protrusions 26 formed on both sides of the adapter recess 25.

The adapter protrusions 26 protrude from the adapter reference plane 28.

The space between the adapter protrusions 26 on both sides of the adapter recess 25 of the adapter 202 is formed by a protruding-portion receiving cutout 202a (including the adapter recess 25) receiving the protruding portion 13b of the coupling 132.

The adapter protrusions 26 may be received in the recessed portions 13c of the coupling 132 at the time of inserting and coupling the optical connector including the coupling 132 shown in FIGS. 15A and 15B to the adapter 202.

The adapter protrusions 26 may be formed in a tubular shape including protrusions protruding from both sides of the protruding portion receiving cutout 202a and the protruding portion receiving cutout 202a along the opening end portion of the adapter 202.

In the example shown in FIGS. 15A and 15B, the protruding portion 13d of the coupling 132 can be inserted into the protruding portion receiving cutout 202a of the adapter 202, so that the coupling reference plane 13i is flush with the adapter reference plane 28.

The coupling 132 can receive the adapter protrusions 26 of the adapter 202 between the protruding portions 13c on both sides of the recessed portion 13b.

The coupling 132 can allow the coupling reference plane 13i to be flush with the adapter reference plane 28 by receiving the adapter protrusions 26 between the protruding portions 13c on both sides of the recessed portion 13b.

When the adapter protrusions 26 are received between the protruding portions 13c on both sides of the recessed portion 13b of the coupling 131 and the coupling reference plane 13i is thus flush with the adapter reference plane 28, the protruding portion 13b is inserted into the end face 201a of the adapter 201 from the adapter reference plane 28.

The coupling 132 shown in FIGS. 15A and 15B include the protruding portion 13b

Accordingly, even when the optical connector including the coupling 132 is inserted into the standard adapter 60, it cannot be coupled to the standard adapter 60, thereby preventing the erroneous connection to the standard optical connector 50 in the standard adapter 60.

The adapter 202 shown in FIGS. 15A and 15B include the adapter protrusions 26

Accordingly, even when the standard optical connector 50 is inserted thereto, it cannot be coupled to the standard optical connector 50, thereby preventing the erroneous connection between the optical connector including the coupling 132 and the standard optical connector 50.

Comparative Examples

Figure 16:
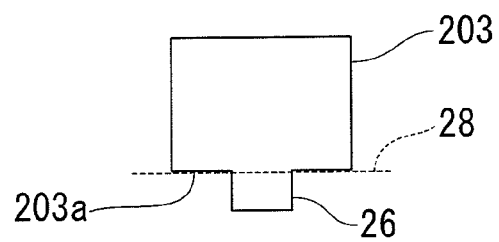
FIG. 16 is a model diagram illustrating a front end structure (a recessed-protruding shape of a connecting end face) of a coupling of an optical connector according to Comparative Example 1 and a protruded-recessed structure of an opening end portion of a connector adapter according to Comparative Example 1.
Figure 16:
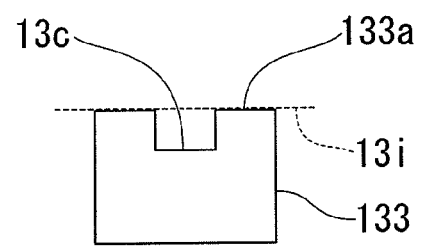
Figure 17:
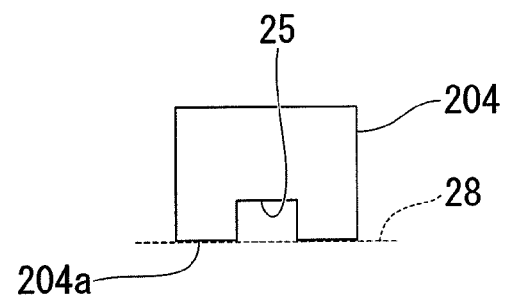
FIG. 17 is a model diagram illustrating a front end structure (a protruded-recessed shape of a connecting end face) of a coupling of an optical connector according to Comparative Example 2 and a protruded-recessed structure of an opening end portion of a connector adapter according to Comparative Example 2.
Figure 17:
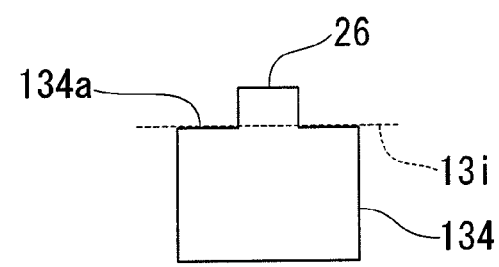

FIGS. 16 and 17 show comparative examples.

First, the comparative example (Comparative Example 1) shown in FIG. 16 will be described.

The front end face of the coupling 133 of the optical connector according to Comparative Example 1 includes a flat portion 133a being flush with the coupling reference plane 13i and a recessed portion 13c.

The coupling 133 does not include any protruding portion 13b.

On the other hand, the adapter 203 shown in FIG. 16 includes a coupling receiving face including a flat portion 203a being flush with the adapter reference plane 28 and an adapter protrusion 26.

By receiving the adapter protrusion 26 of the adapter 203 in the recessed portion 13c of the coupling 133, the coupling reference plane 28 can be made to be flush with the adapter reference plane 13i.

When a standard optical connector is inserted into and coupled to the adapter 203 according to Comparative Example 1, the front end face of the coupling of the standard optical connector comes in contact with the adapter protrusion 26, thereby preventing the coupling to the standard optical connector.

However, the optical connector including the coupling 133 can be inserted into the standard adapter up to the same position as the standard optical connector and can be coupled to the standard adapter similarly to the standard optical connector, thereby not preventing an erroneous coupling.

The front end face of a coupling 134 of an optical connector according to the comparative example (Comparative Example 2) shown in FIG. 17 includes a flat portion 133a being flush with the coupling reference plane 13i and a protruding portion 13b.

The recessed portion 13c is not formed in the front end face of the coupling 134.

On the other hand, an adapter 204 shown in FIG. 17 includes a coupling receiving face having a flat portion 204a being flush with the adapter reference plane 28 and an adapter recess 25.

By inserting the protruding portion 13b of the coupling 134 into the adapter recess 25 of the adapter 204, the coupling reference plane 28 can be made to be flush with the adapter reference plane 13i.

When the optical connector including the coupling 134 according to Comparative Example 2 is inserted into the standard adapter, the protruding portion 13b comes in contact with the coupling contact face 65 of the standard adapter 60, thereby preventing the coupling to the standard adapter.

On the other hand, since the adapter 204 does not include the adapter protrusion 26, the standard optical connector can be inserted and coupled thereto, thereby not preventing the coupling to the standard optical connector.

The optical connector including the coupling 134 shown in FIGS. 14A, 14B, 15A, 15B and 17 can be satisfactorily prevented from being erroneously connected to a standard optical connector in a standard adapter.

However, when the optical connector including the coupling 134 shown in FIG. 17 is used to connector-connect optical fibers along with the adapter 204 in a place (spot) where optical fibers with a standard optical connector attached to the ends thereof and the standard adapter, it is not possible to prevent the erroneous connection to the standard optical connector in the adapter 204.

The optical connector including the coupling 133 shown in FIG. 16 cannot prevent the erroneous connection to a standard optical connector in a standard adapter.

On the contrary, the optical connectors including the couplings 131 and 132 shown in FIGS. 14A, 14B, 15A and 15B can satisfactorily prevent the erroneous connection to a standard optical connector in a standard adapter and can satisfactorily prevent the erroneous connection to a standard optical connector in the adapters 201 and 202 used for the connection.

The optical connectors including the couplings 131 and 132 shown in FIGS. 14A, 14B, 15A and 15B and the adapters 201 and 202 used for the connection thereof effectively contribute to the prevention of the erroneous connection to a standard optical connector.

The optical connector and the adapter according to the invention can be employed by an optical communication system such as a connecting place or a branching place of optical fibers constituting optical fiber lines and a LAN.

In the optical communication system, for example, plural types of optical fibers different in the number of cores of optical fiber tapes, the types of the optical fibers, and the like may be used.

In this case, to distinguish the different optical fibers, the optical connectors according to the different embodiments may be applied to optical connectors to be identified.

For example, when the optical connectors to be identified differ from each other in the number of at least one of the protruding portions and the recessed portions of the couplings, it is possible to effectively contribute to the distinction of the optical connectors.

Also, when the optical connectors to be identified differ from each other in the arrangement of at least one of the protruding portions and/or the recessed portions of the couplings, it is possible to effectively contribute to the distinction of the optical connectors.

By using the adapters of which the number or arrangement of the adapter protrusions and the adapter recesses is set to allow the insertion and coupling of the optical connectors thereto depending on the number and/or the arrangement of the protruding portions and/or the recessed portions of the coupling for each optical connector, it is possible to prevent the erroneous connection between optical connectors.

For example, in the optical communication system such as a connecting place or a branching place of optical fibers and a LAN, plural connector coupling sections in which optical fibers are connector-connected to each other using a connector adapter so as to connect a plurality of lines are often provided.

In these places, the optical connector and the adapter according to the invention can be effectively utilized to realize the connector connection between optical fibers as distinct from a standard optical connector.

In addition, the optical connectors and the connector adapters may be distinguished from each other by changing the colors of a part (for example, the housing) of the optical connectors and the corresponding connector adapters.

For example, by changing the color of a housing depending on a spring pressure of an optical connector, it is possible to prevent the erroneous connection.

In terms of easy identification, it is preferable that the place of the optical connector of which the color should be changed is a coupling thereof.

The number of cores corresponding to the optical connector according to the invention can be properly set.

Figure 18A:
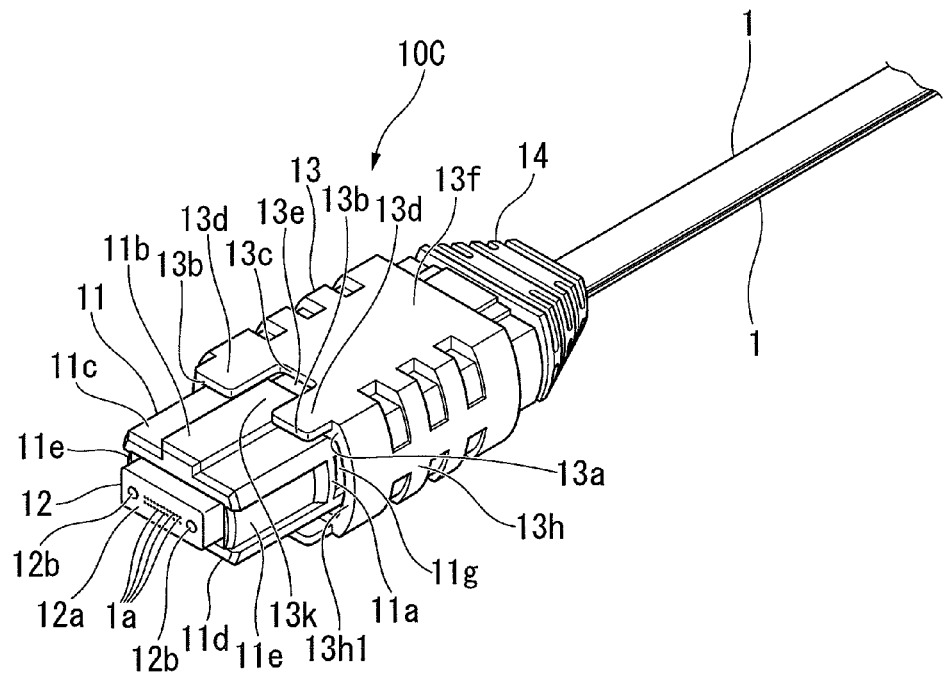
FIGS. 18A and 18B are perspective views illustrating optical connectors according to other embodiments of the invention.
Figure 18B:
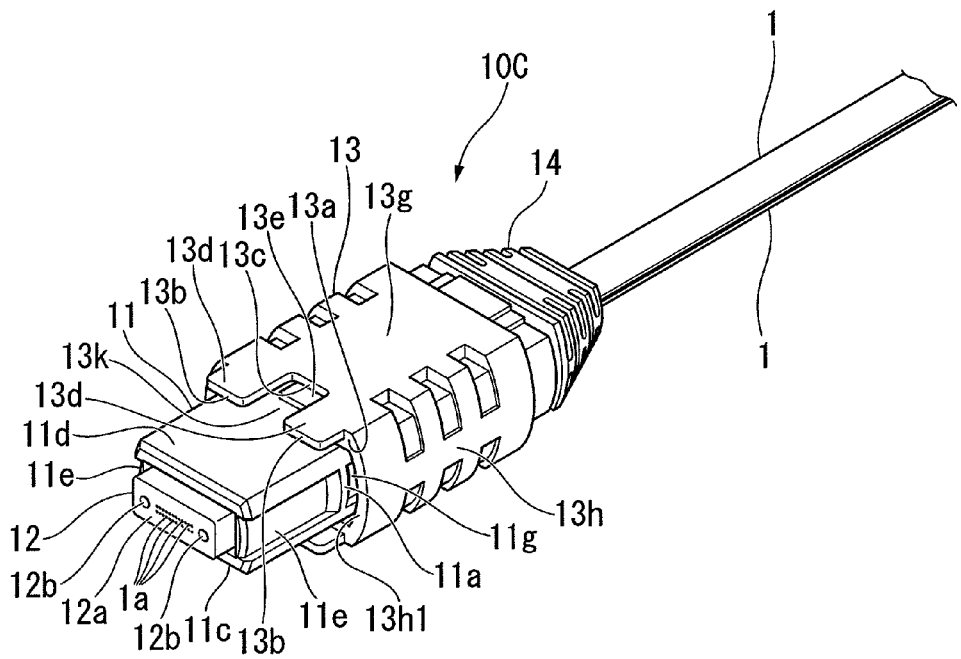

An example thereof is shown in FIGS. 18A and 18B.

An optical connector 10C shown in FIGS. 18A and 18B is a 24-core optical connector (MPO type optical connector) attached to an end of two 12-core optical fiber tapes.

The optical connector 10C shown in the drawing is assembled using the same components as the optical connector 10 shown in FIGS. 1A and 1B, except that a 24-core ferrule is employed as the ferrule 12.

In the 24-cores optical connector 10C, the spring pressure of the spring 15 elastically impelling the ferrule is set to be larger than the spring pressure defined in the IEC standard so as to guarantee a butting force suitable for realizing the PC connection at the time of butt jointing the ferrules.

Hereinafter, the optical connector 10C is also referred to as an optical connector with a changed spring pressure.

The optical connector 10C includes a coupling 13 having protruding portions 13b and recessed portions 13c formed therein.

Accordingly, the optical connector 10C can prevent the erroneous connection to an optical connector (standard-coupling optical connector) including the same housing and coupling (hereinafter, also referred to as a standard coupling) as the standard optical connector 50, thereby using the optical connector in satisfactory distinction from the standard-coupling optical connector.

For example, since a 24-core optical connector (hereinafter, referred to as a standard-coupling 24 MPO) (of the spring pressure is defined in the IEC standard), which is assembled using the same components as the standard optical connector 50 except that the 24-core ferrule is employed, is different from the optical connector 10C shown in FIGS. 18A and 18B in the appearance of the coupling, they can be easily visually distinguished from each other.

The connection between the standard coupling optical connectors can be performed using the standard adapter 60, but the optical connector 10C is not coupled to the standard adapter 60 and thus does not cause the erroneous connection to the standard-coupling 24 MPO in the standard adapter 60.

The standard-coupling connector is not coupled to the adapter 20 used for the connection between the optical connector 10C and thus the optical connector 10C does not cause the erroneous connection to the standard-coupling 24 MPO in the adapter 20.

As a result, it is possible to satisfactorily used the optical connector 10C as distinct from a standard-coupling 24 MPO.

While preferred embodiments of the invention have been described and illustrated above, it should be understood that these are exemplary of the invention and are not to be considered as limiting Additions, omissions, substitutions, and other modifications can be made without departing from the scope of the present invention Accordingly, the invention is not to be considered as being limited by the foregoing description, and is only limited by the scope of the appended claims.

What is claimed is:

1. An optical connector configured to be connected in a connector adaptor comprising:
    a housing that receives a ferrule; and
    a coupling into which the housing is inserted, the coupling having a front end face, wherein
    the connector adaptor includes a first connector insertion hole at one end and a second connector insertion hole at an other end, and the optical connector is capable of being inserted into at least the first connector insertion hole,
    the optical connector is configured, when inserted into the first insertion hole, to connect to an optical connector inserted into the second insertion hole, and
    the front end face comprises one or more protruding portions and one or more recessed portions, the recessed portions being configured to be fitted into corresponding adapter protrusions of the connector adaptor, and the protruding portions being configured to prevent erroneous coupling to an other connector adaptor having a flat coupling contact face on an inner surface thereof, the other connector adaptor being configured to be fitted to the other optical connector having a coupling with a flat front end face.

2. The optical connector according to claim 1, further comprising a key protruding from a side surface of the housing and extending in a connector length direction,
    wherein the coupling includes one or more the protruding portions or the recessed portions on the side of the key.

3. The optical connector according to claim 2, wherein the connecting end face of the coupling includes the recessed portions just above the key and the protruding portions on at least one side in the width direction of the recessed portions.

4. The optical connector according to claim 3, wherein the connecting end face of the coupling includes one or more the protruding portions or the recessed portions on the opposite side of the key.

5. The optical connector according to claim 2, wherein the connecting end face of the coupling includes one or more the protruding portions or the recessed portions on the opposite side of the key.

6. A connector adapter comprising:
    a tubular adapter housing including a first connector insertion hole one end, a second insertion hole at an other end, and a coupling contact face formed on an inner surface of the tubular adapter housing, wherein
    at least the first connector insertion hole is capable of having an optical connector inserted therein,
    the optical connector is configured, when inserted into the first connector insertion hole, to connect to an optical connector inserted into the second connector insertion hole, and
    one or more adapter protrusions and one or more adapter recesses are formed on the coupling contact face of the tubular adapter housing, the adapter recesses being configured to be fitted into corresponding protruding portions of the optical connector, and the adapter protrusions prevent erroneous coupling to an other optical connector having a coupling with a flat front end face, the other optical connector being configured to be fitted to an other tubular adapter housing having a flat coupling contact face inside surface.

7. An optical fiber line comprising:
    a connector coupling section in which optical fibers are coupled to each other using the optical connector according to claim 1 and a connector adapter coupled to the optical connector.

8. An optical communication system comprising:
    optical fibers coupled to each other using the optical connector according to claim 1 attached to an end of the optical fibers and using a connector adapter coupled to the optical connector.

9. The optical communication system according to claim 8, wherein
    the optical connector includes a first optical connector and a second optical connector, and the first optical connector and the second optical connector differ from each other in the number of at least one of the protruding portions and recessed portions of the coupling.

10. The optical communication system according to claim 8, wherein
    the optical connector includes a first optical connector and a second optical connector, and the first optical connector and the second optical connector differ from each other in the arrangement of at least one of the protruding portions and recessed portions of the coupling.

11. The optical communication system according to claim 8, wherein
    the optical connector includes a first optical connector and a second optical connector, and the first optical connector and the second optical connector differ from each other in the color of at least a part of the optical connectors.

12. The optical communication system according to claim 11, wherein
    the first optical connector and the second optical connector differ from each other in the color of the coupling.

* * * * *